United States Patent
Park et al.

(10) Patent No.: US 10,721,749 B2
(45) Date of Patent: Jul. 21, 2020

(54) METHOD AND ELECTRONIC DEVICE FOR PERFORMING DATA COMMUNICATION USING A FREQUENCY BAND SHARED AMONG DIFFERENT RADIO ACCESS TECHNOLOGIES

(71) Applicant: Samsung Electronics Co., Ltd., Gyeonggi-do (KR)

(72) Inventors: Sung-Jin Park, Seoul (KR); Dae-Ho Kang, Gyeonggi-do (KR); Hyun-Hee Kim, Seoul (KR); Chang-Won Nam, Seoul (KR); Min-Chull Paik, Gyeonggi-do (KR); Hyung-Yeol Lee, Seoul (KR); Won-Joon Cho, Seoul (KR); Na-Young Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/827,728

(22) Filed: Nov. 30, 2017

(65) Prior Publication Data

US 2018/0152955 A1 May 31, 2018

(30) Foreign Application Priority Data

Nov. 30, 2016 (KR) .......................... 10-2016-0162364

(51) Int. Cl.
*H04W 72/12* (2009.01)
*H04B 1/00* (2006.01)
(Continued)

(52) U.S. Cl.
CPC ...... *H04W 72/1215* (2013.01); *H04B 1/0057* (2013.01); *H04W 36/0027* (2013.01);
(Continued)

(58) Field of Classification Search
None
See application file for complete search history.

(56) References Cited

U.S. PATENT DOCUMENTS

| 9,148,889 B2* | 9/2015 | Wietfeldt | .......... H04W 72/1215 |
| 2008/0238570 A1* | 10/2008 | Hangai | ..................... H01P 1/15 333/103 |

(Continued)

FOREIGN PATENT DOCUMENTS

| KR | 10-2015-0112629 | 10/2015 |
| KR | 10-2016-0083958 | 7/2016 |
| WO | WO 2016/123568 | 8/2016 |

OTHER PUBLICATIONS

International Search Report dated Mar. 9, 2018 issued in counterpart application No. PCT/KR2017/013964, 11 pages.

*Primary Examiner* — Ayaz R Sheikh
*Assistant Examiner* — Tarell A Hampton
(74) *Attorney, Agent, or Firm* — The Farrell Law Firm, P.C.

(57) ABSTRACT

An electronic device is provided. The electronic device includes at least one antenna on a designated band, at least one filtering unit for filtering signals received from the at least one antenna into a plurality of bands of the designated band, at least one switching unit for outputting the signals filtered by the at least one filtering unit to a first communication unit using a first communication function and a second communication unit using a second communication function, and a processor electrically connected with the at least one switching unit, the first communication unit, and the second communication unit for controlling the at least one switching unit so that, when a signal of a first band in the designated band is output to the first communication (Continued)

unit, a signal of a second band in the designated band is output to the second communication unit.

21 Claims, 19 Drawing Sheets

(51) Int. Cl.
    *H04W 36/00*     (2009.01)
    *H04W 36/34*     (2009.01)
    *H04W 36/06*     (2009.01)
    *H04W 88/06*     (2009.01)

(52) U.S. Cl.
    CPC ............ *H04W 36/34* (2013.01); *H04W 36/06* (2013.01); *H04W 88/06* (2013.01)

(56) References Cited

U.S. PATENT DOCUMENTS

| | | | |
|---|---|---|---|
| 2010/0080323 A1* | 4/2010 | Mueck | H04J 11/0033 375/296 |
| 2010/0157858 A1 | 6/2010 | Lee et al. | |
| 2011/0116490 A1* | 5/2011 | Wilhelmsson | H04W 16/14 370/343 |
| 2011/0149764 A1* | 6/2011 | Wietfeldt | H04W 88/06 370/252 |
| 2011/0176532 A1* | 7/2011 | Franceschini | H04L 5/0005 370/342 |
| 2011/0269502 A1* | 11/2011 | Clark | H04B 1/006 455/552.1 |
| 2011/0312288 A1* | 12/2011 | Fu | H04B 1/406 455/88 |
| 2012/0164948 A1* | 6/2012 | Narasimha | H04W 72/1215 455/63.1 |
| 2012/0213116 A1* | 8/2012 | Koo | H04B 1/1027 370/253 |
| 2013/0148636 A1 | 6/2013 | Lum et al. | |
| 2013/0285862 A1* | 10/2013 | De Luis | H01Q 1/243 343/722 |
| 2014/0031036 A1* | 1/2014 | Koo | H04W 36/14 455/434 |
| 2014/0194155 A1 | 7/2014 | Ko et al. | |
| 2014/0307599 A1 | 10/2014 | Rousu | |
| 2015/0282196 A1 | 10/2015 | Kim et al. | |
| 2016/0112073 A1 | 4/2016 | Lum et al. | |
| 2016/0277877 A1* | 9/2016 | Tsunoda | H04W 84/18 |
| 2017/0163293 A1* | 6/2017 | Lee | H04B 1/0057 |
| 2017/0201997 A1* | 7/2017 | Cheng | H04W 72/082 |
| 2017/0288842 A1* | 10/2017 | Lim | H04B 1/00 |

* cited by examiner

| ELEMENT ID (1 OCTETS) | LENGTH (5 OCTETS) | STATION COUNT (5 OCTETS) | CHANNEL UTILIZATION (2 OCTETS) | AVAILABLE ADMISSION CAPACITY (2 OCTETS) |
|---|---|---|---|---|

FIG.18

METHOD AND ELECTRONIC DEVICE FOR PERFORMING DATA COMMUNICATION USING A FREQUENCY BAND SHARED AMONG DIFFERENT RADIO ACCESS TECHNOLOGIES

PRIORITY

This application claims priority under 35 U.S.C. § 119(a) to Korean Patent. Application Serial No. 10-2016-0162364, which was filed in the Korean Intellectual Property Office on Nov. 30, 2016, the entire disclosure of which is incorporated herein by reference.

BACKGROUND

1. Field of the Disclosure

The present disclosure relates, generally, to communication control methods, and more particularly, to methods and electronic devices for performing data communication using a frequency band shared among different radio access technologies (RATs).

2. Description of the Related Art

With the development of wireless technology and increasing 4G long term evolution (LTE)/LTE-advanced (LTE-A) mobile data traffic, carriers operating limited frequency bands are seeking various ways for mobile data traffic offloading.

Various techniques have been adopted for offloading the mobile traffic, e.g., carrier aggregation (CA), which is a bandwidth spreading scheme. CA may increase data transmissions and receptions by as much as the spread band as compared with data transmission/reception on a single spread band.

However, more evolved wireless communication systems are required to address the issues relating to higher-speed services and lacking resources that are faced by the current wireless communication systems.

In an effort to address the increasing traffic issue, 3GPP continues technical discussion for adopting unlicensed bands, which are currently in use for, e.g., wireless-fidelity (Wi-Fi) or bluetooth (BT), in LTE systems which communicate on frequency bands licensed by the government.

The use of LTE technology for unlicensed bands may be referred to as licensed-assisted access ("LAA").

LTE is in wide use among many service providers. Thus, if LTE-based communication devices are involved in communication on unlicensed bands, other electronic devices that communicate on the unlicensed bands may also be influenced.

If an LTE system base station configures an LAA cell with the same or close frequency to a particular frequency while Wi-Fi is operated on the particular frequency, the two technologies may affect each other, causing a performance deterioration.

Thus there exists a need for a method for allowing simultaneous use of the same or neighbor unlicensed frequency bands among different RATs.

SUMMARY

The present disclosure has been made to address at least the disadvantages described above and to provide at least the advantages described below. According to an aspect of the present disclosure, a communication control method and electronic device for performing data communication using a frequency band that may be shared among different RATs of an electronic device is provided.

According to an aspect of the present disclosure, a communication control method and electronic device for allowing different RATs of an electronic device to share an unlicensed band is provided.

In accordance with an aspect of the present disclosure, there is provided an electronic device. The electronic device includes at least one antenna on a designated band, at least one filtering unit for filtering signals received from the at least one antenna into a plurality of bands of the designated band, at least one switching unit for outputting the signals filtered by the at least one filtering unit to a first communication unit using a first communication function and a second communication unit using a second communication function, and a processor electrically connected with the at least one switching unit, the first communication unit, and the second communication unit for controlling the at least one switching unit so that, when a signal of a first band in the designated band is output to the first communication unit, a signal of a second band in the designated band is output to the second communication unit.

In accordance with an aspect of the present disclosure, there is provided a method for controlling communication in an electronic device. The method includes filtering signals received from one or more antennas for communication on a designated band into signals of two or more bands and performing switching so that, upon outputting a signal of a first band of the two or more bands to a first communication unit using a first communication function, a signal of a second band of the two or more bands is output to a second communication unit using a second communication function.

BRIEF DESCRIPTION OF THE DRAWINGS

The above and other aspects, features and advantages of certain embodiments of the present disclosure will be more apparent from the following detailed description taken in conjunction with the accompanying drawings, in which:

FIG. 18 is a diagram of a parameter used for selecting an AP on an electronic device, according to an embodiment of the present disclosure.

DETAILED DESCRIPTION

Figure 1:
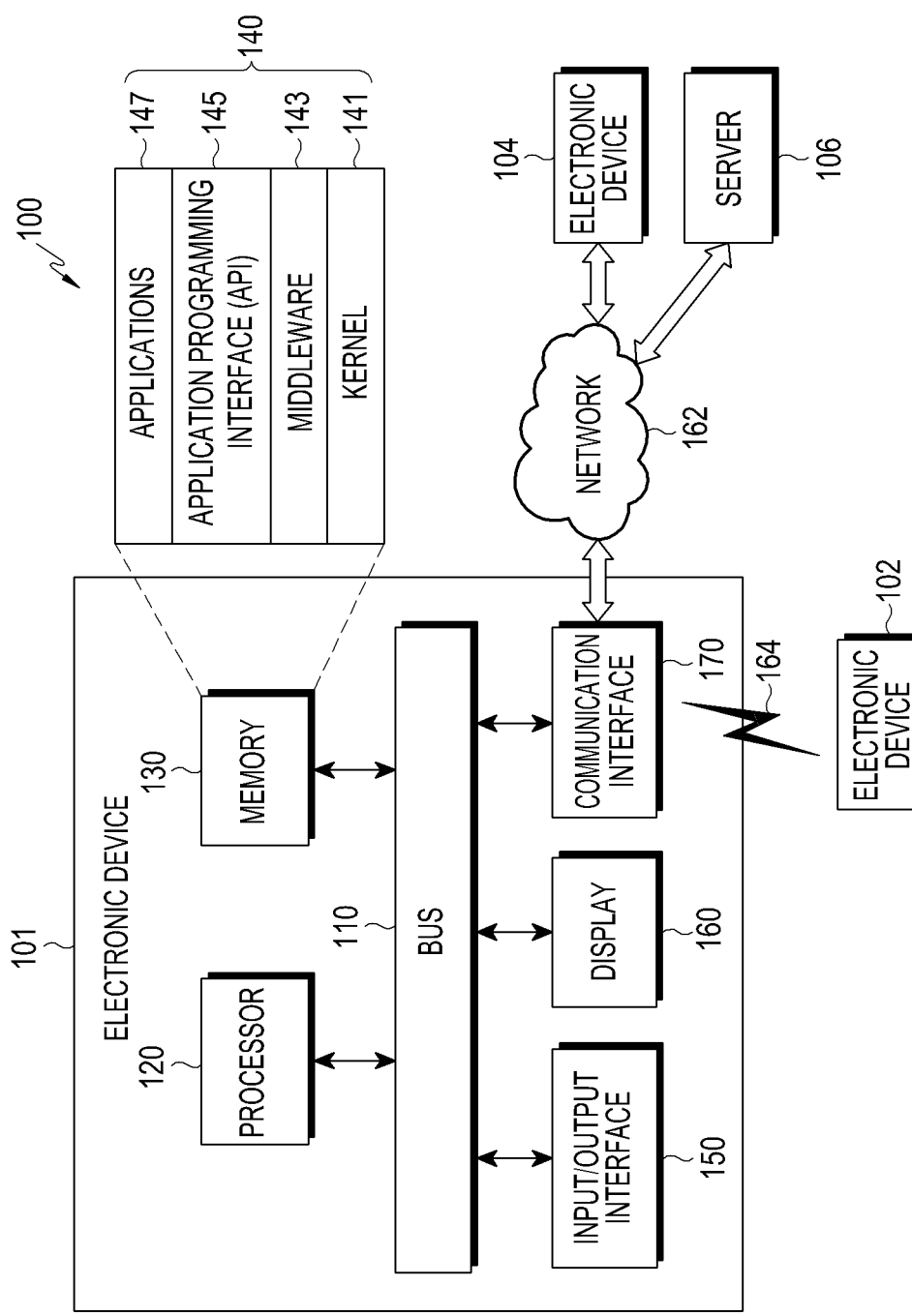
FIG. 1 is a diagram of an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an application-specific integrated circuit (ASIC) chip, a field-programmable gate arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

Referring to FIG. 1, an electronic device 100 is included in a network environment 101, according to an embodiment of the present disclosure. The electronic device 101 includes a bus 110, a processor 120, a memory 130, an input/output interface 150, a display 160, and a communication interface 170. The electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor, or a communication processor (CP). The processor 120 may control at least one of the other components of the electronic device 101, and/or perform an operation or data processing relating to communication.

The memory 130 may include a volatile and/or non-volatile memory. The memory 130 may store commands or data related to at least one other component of the electronic device 101. The memory 130 may store software and/or a program 140. The program 140 may include, e.g., a kernel 141, middleware 143, an application programming interface (API) 145, and/or an application program (application) 147. At least a portion of the kernel 141, middleware 143, or API 145 may be referred to as an operating system (OS). The input/output interface 150 may transfer commands or data input from the user or other external device to other component(s) of the electronic device 101 or may output commands or data received from other component(s) of the electronic device 101 to the user or other external devices.

The display 160 may include a liquid crystal display (LCD), a light emitting diode (LED) display, an organic light emitting diode (OLED) display, or a microelectromechanical systems (MEMS) display, or an electronic paper display. The display 160 may display various contents (e.g., text, images, videos, icons, or symbols) to the user. The display 160 may include a touchscreen and may receive a touch, gesture, proximity or hovering input using an electronic pen or a body portion of the user.

The communication interface 170 may set up communication between the electronic device 101 and a first electronic device 102, a second electronic device 104, or a server 106. The communication interface 170 may be connected with the network 162 through wireless or wired communication to communicate with the external electronic device.

The wireless communication may include cellular communication which uses at least one of LTE, LTE-A, LTE in unlicensed spectrum (LTE-U), code division multiple access (CDMA), wideband code division multiple access (WCDMA), universal mobile telecommunication system (UMTS), wireless broadband (WiBro), or global system for mobile communication (GSM). The wireless communication may include at least one of Wi-Fi, BT, BT low power (BLE), zigbee, near field communication (NFC), magnetic secure transmission (MST), radio frequency, or body area network (BAN). The wireless communication may include global navigation satellite system (GNSS). The GNSS may be global positioning system (GPS), global navigation satellite system (Glonass), Beidou navigation satellite system (Beidou) or Galileo, or the European global satellite-based navigation system. Hereinafter, the terms GPS and the GNSS may be interchangeably used herein. The wired connection may include at least one of a universal serial bus (USB), a high definition multimedia interface (HDMI), a recommended standard (RS)-232, a power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. All or some of operations executed on the electronic device 101 may be executed on the electronic devices 102 and 104 or server 106. When the electronic device 101 performs some function or service automatically or at a request, the electronic device 101, instead of executing the function or service on its own or additionally, may request the electronic devices 102 and 104 or server 106 to perform at least some functions associated therewith. The electronic devices 102 and 104 or server 106 may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
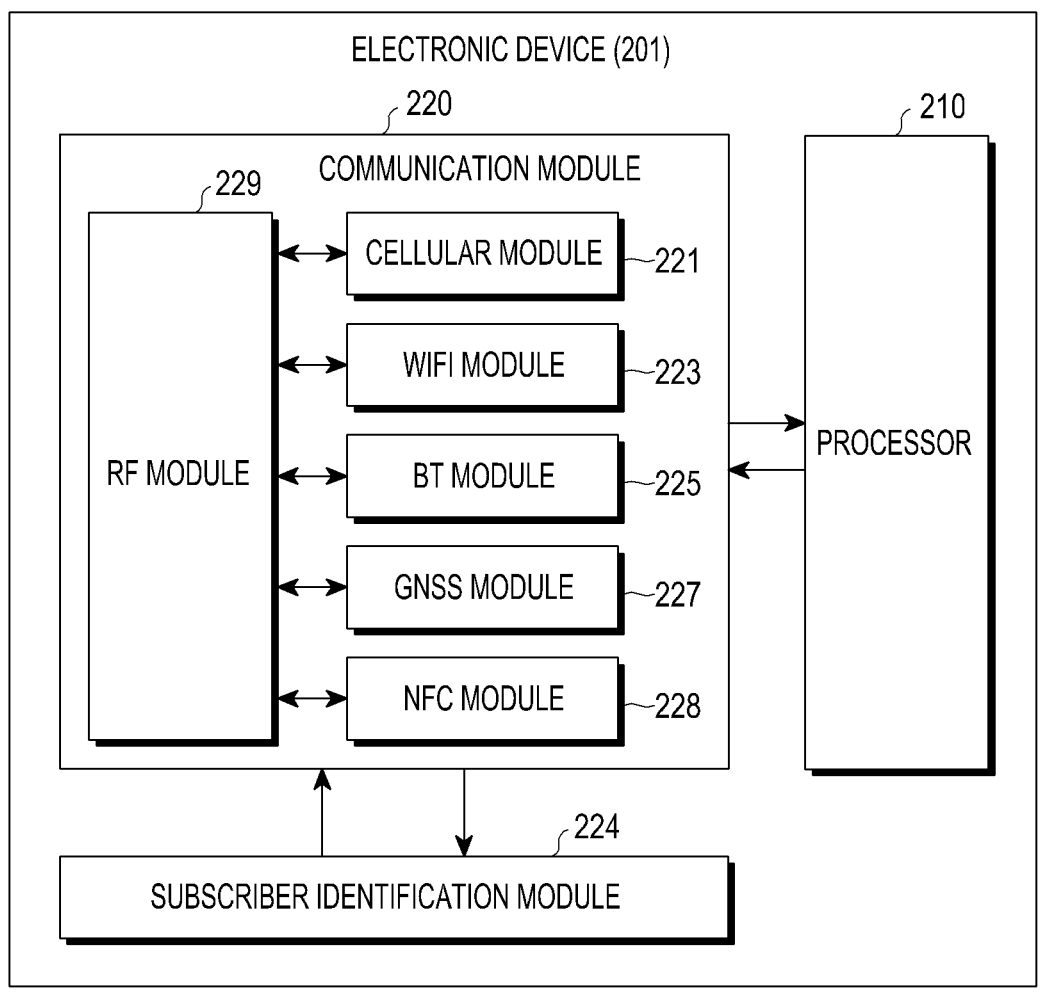
FIG. 2 is a block diagram of an electronic device, according to an embodiment of the present disclosure.

FIG. 2 is a block diagram of an electronic device 201, according to an embodiment of the present disclosure. The electronic device 201 includes all or some of the components of the electronic device 101 of FIG. 1. The electronic device 201 may include one or more processors (e.g., application processors) 210, a communication module 220, and a subscription identification module (SIM) 224.

The processor 210 may control multiple hardware and software components connected to the processor 210 by running, e.g., an OS or application programs, and the processor 210 may process and compute various data. The processor 210 may be implemented in a system on chip (SoC). The processor 210 may further include a graphic processing unit (GPU) and/or an image signal processor. The processor 210 may include at least some (e.g., a cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may include the cellular module 221, a Wi-Fi module 223, a BT module 225, a GNSS module 227, a NFC module 228, and a RF module 229. The cellular module 221 may provide voice call, video call, text, or Internet services through a communication network. The cellular module 221 may perform identification or authentication on the electronic device 201 in the communication network using the SIM 224. The cellular module 221 may perform at least some of the functions provided by the processor 210. The cellular module 221 may include a CP. At least some (e.g., two or more) of the cellular module 221, the Wi-Fi module 223, the BT module 225, the GNSS module 227, or the NFC module 228 may be included in a single integrated circuit (IC) or an IC package. The RF module 229 may communicate data, e.g., communication signals (e.g., RF signals). The RF module 229 may include a transceiver, a power amp module (PAM), a frequency filter, a low noise amplifier (LNA), or an antenna. At least one of the cellular module 221, the Wi-Fi module 223, the BT module 225, the GNSS module 227, or the NFC module 228 may communicate RF signals through a separate RF module. The SIM 224 may include, e.g., a card including a subscriber identification module, or be an embedded SIM, and may contain unique identification information (e.g., an integrated circuit card identifier (ICCID) or subscriber information (e.g., an international mobile subscriber identity (IMSI)).

Although systems supporting wireless short-range communication, e.g., Wi-Fi or wireless LAN, and LAA-supportive systems are described as examples of different RATs capable of simultaneously using an unlicensed band frequency, it should be noted that the present disclosure is not limited thereto. For example, communication systems with a similar technical background with minor changes without significantly departing from the scope of the present disclosure can also be used with the methods and apparatuses described herein.

Given the limitation in the number of unlicensed bands, such as LTE frequency (which encompasses all LTE evolutions unless stated otherwise), serving LTE on unlicensed bands, e.g., 5GH band, is under research, which is called LAA. A developed pre-standard technique is LTE-unlicensed (LTE-U) that uses LTE in unlicensed bands. The 3GPP release-13 started to add LTE-adopted LAA to the specification. Recent release-14 has recently included the uplink part as eLAA.

Meanwhile, an RAT, such as wireless local area network (WLAN) also known as IEEE 802.11x (Wi-Fi) may provide data communication utilizing an unlicensed frequency band present in 2.4 GHz or 5 GHz band as communication technology to establish a wireless local network. Generally, a Wi-Fi-based wireless local network consists of an AP functioning as a gateway with the external Internet and multiple stations (STAs) accessing the AP to use data communication services. Here, the AP and the STAs use the same frequency channel. The AP and STAs, when required to transmit packets, obtain a wireless channel access authority based on binary exponential backoff-based carrier sense multiple access/collision avoidance (CSMA/CA) and transmit packets to the destination.

Although the following description focuses primarily on a Wi-Fi communication scheme and LAA communication scheme as examples of two or more communication schemes sharing an unlicensed frequency band, embodiments of the present disclosure are not limited thereto.

Figure 3:
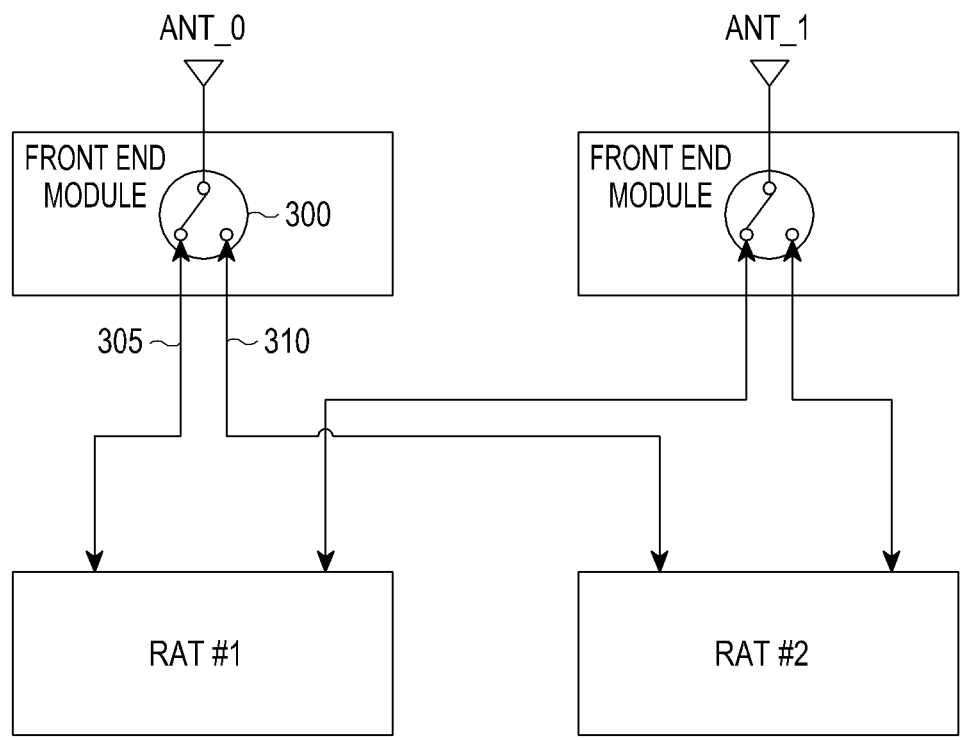
FIGS. 3 to 5 are diagrams of an electronic device in which different communication technologies may share an unlicensed band, according to an embodiment of the present disclosure.
Figure 4:
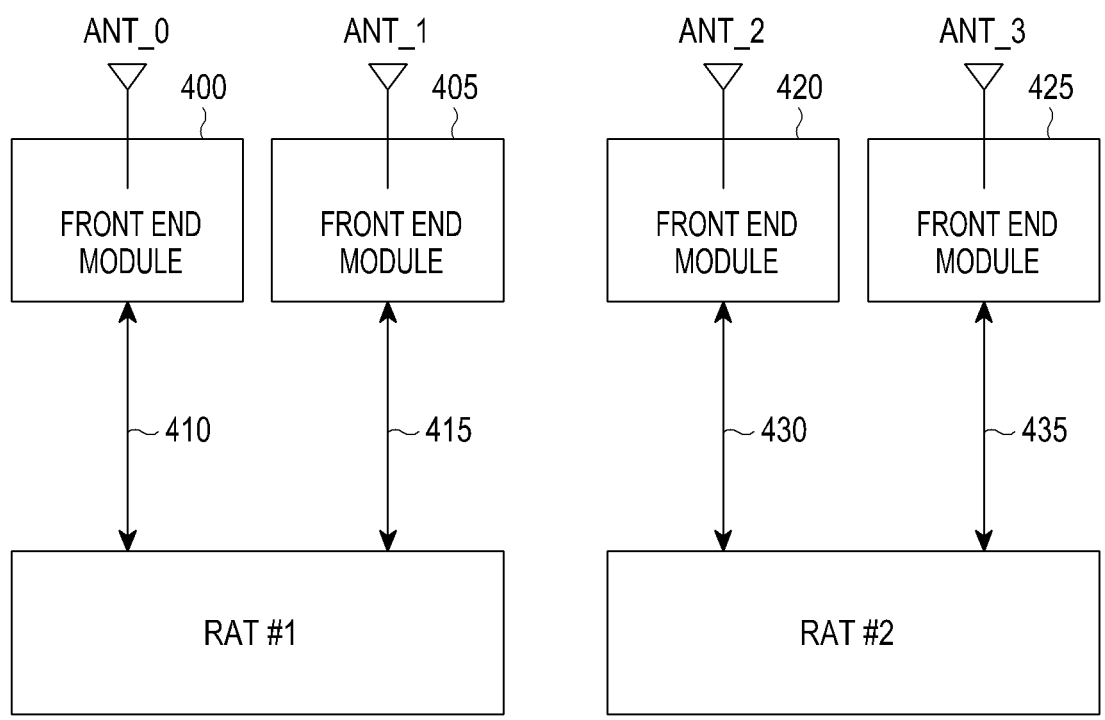
Figure 5:
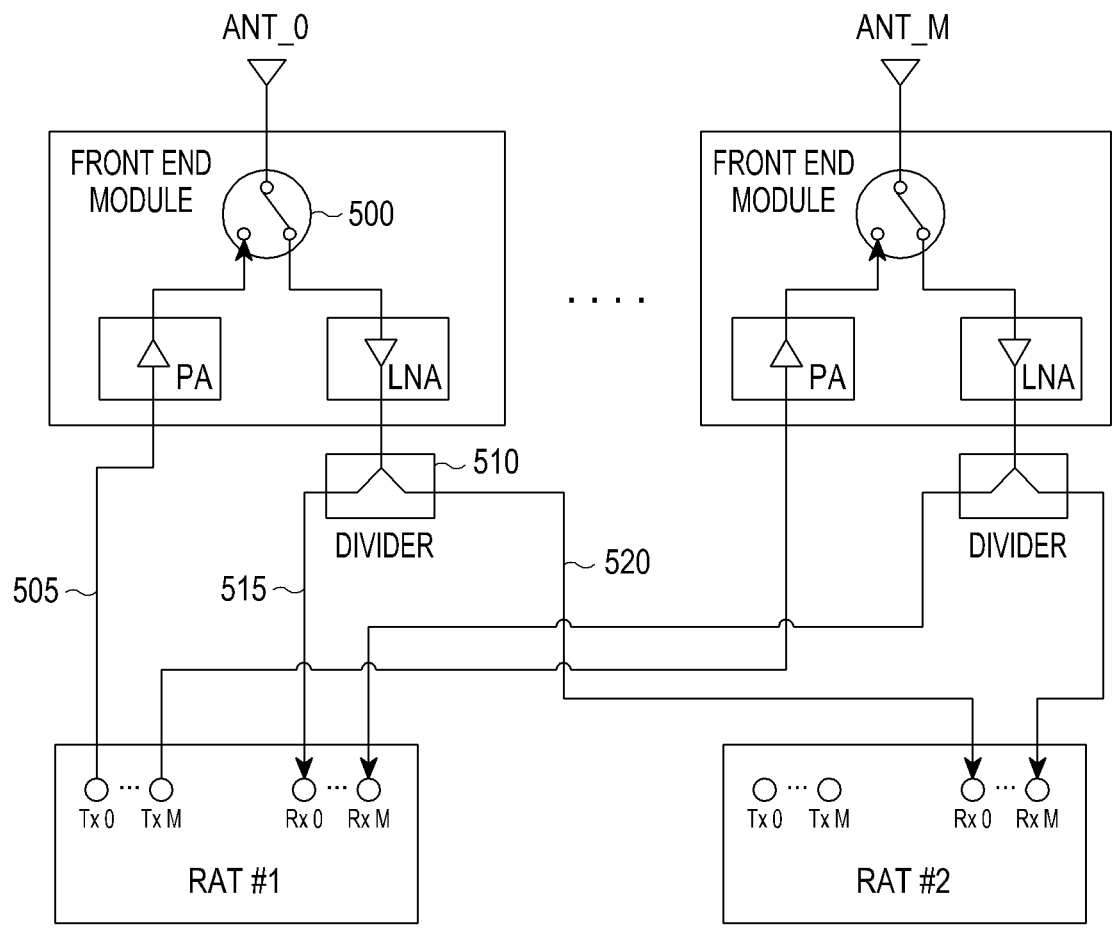

FIGS. 3 to 5 are diagrams of an electronic device in which different communication technologies may share an unlicensed band, according to an embodiment of the present disclosure.

FIG. 3 illustrates an example of an internal configuration of an electronic device where time division is performed in a time-division multiple access (TDMA) scheme and each RAT is used. For example, two RATs, e.g., LTE-U/LAA and Wi-Fi, may share one antenna due to limitations in the hardware design inside the electronic device as shown in FIG. 3. Wi-Fi uses two antennas (e.g., ANT_0 and ANT_1) temporarily separated from each other, one of which serves as a main antenna (e.g., ANT_0) and the other a sub antenna (e.g., ANT_1). For example, where the main antenna is ANT_0, a switch 300 in a front end module (FEM) connects the output end of the main antenna (e.g., ANT_0) with the input end of RAT #1 (e.g., a Wi-Fi module) during a first period, forming a first communication path 305. During a second period which is a next communication time period, the switch 300 may connect the output end of the main antenna (e.g., ANT_0) with the input end of RAT #2 (e.g., an LTE-U/LAA module), forming a second communication path 310. To secure the maximum transmission diversity, the two antennas are separated as the main antenna and sub antenna which provide channels independent from each other. Where the ANT_0 which is primarily used as main antenna suffers from a performance deterioration due to, e.g., the user's holding the electronic device in his hand, the ANT_1 turns the main antenna on while the ANT_0 turns the sub antenna on. As described above, the two RATs are operated in different time intervals, and thus, their respective RAT communication may proceed without interference therebetween.

FIG. 4 is a diagram of an internal configuration of an electronic device where an antenna is added to simultaneously use RAT technologies. For example, Wi-Fi uses two antennas (e.g., ANT_0 and ANT_1) for Wi-Fi communication. The respective output ends of the two antennas (e.g., ANT_0 and ANT_1) may be connected to the input end of RAT #1 (e.g., a Wi-Fi module) through front end modules 400 and 405, forming first communication paths 410 and 415.

FIG. 4 illustrates separate dedicated antennas ANT_2 and ANT_3, in addition to the two antennas (e.g., ANT_0 and ANT_1) for Wi-Fi communication, that are implemented in the electronic device for LTE-U/LAA communication. The respective output ends of the two antennas ANT_2 and ANT_3 may be connected to the input end of RAT #2 (e.g., an LTE-U/LAA module) through the front end modules 420 and 425, forming second communication paths 430 and 435. Where an isolation is secured between the antennas as shown in FIG. 4, the two RATs may be operated independent from each other. Also where the frequency bands used in the two RATs are sufficiently spaced apart from each other, they may be operated without interference therebetween.

FIG. 5 illustrates an internal configuration of an electronic device where two RATs share a transmission/reception path by way of a divider.

In an Rx mode, the switch 500 in the front end module may connect the output end of the antenna ANT_0 with the input end of the divider 510, forming a communication path. The divider 510 may send a first RAT signal 515 (e.g., a Wi-Fi signal) to RAT #1 (e.g., a Wi-Fi module) while sending a second RAT signal 520 (e.g., an LTE-U/LAA signal) to RAT #2 (e.g., an LTE-U/LAA module), thus enabling simultaneous receipt of the LTE-U/LAA signal and the Wi-Fi signal.

For example, Wi-Fi scanning may be enabled while receiving the LTE-U/LAA signal (or data). During the Tx interval for transmitting the Wi-Fi signal, the switch 500 may connect the output end of RAT #1 (e.g., a Wi-Fi module) with the input module of the antenna (ANT_0), forming a communication path for Wi-Fi transmission 505. The receipt of LTE-U/LAA signal is temporarily disconnected due to the switching of the switch 500 for transmission of the Wi-Fi signal, but the lowering in performance is minimal; the reason being, where Wi-Fi scanning is active scanning, the electronic device sends a probe request and receives a probe response per Wi-Fi channel. The length of the probe request frame is short, and therefore, although the receipt of LTE-U/LAA signal is disconnected, the disconnection happens for a very short time. Thus, the performance might not be significantly influenced.

Although the electronic device of FIGS. 3 to 5 is able to use the RATs, the electronic device of FIGS. 3 to 5 also provides a secure stable and maximized data speed while addressing the space limitations in the electronic device in light of hardware concerns.

Now described is a method for supporting different RATs, e.g., Wi-Fi RAT and LAA RAT, on an electronic device using an antenna intended for unlicensed band communication while allowing the different RATs to commonly and simultaneously use unlicensed band frequency.

Figure 6:
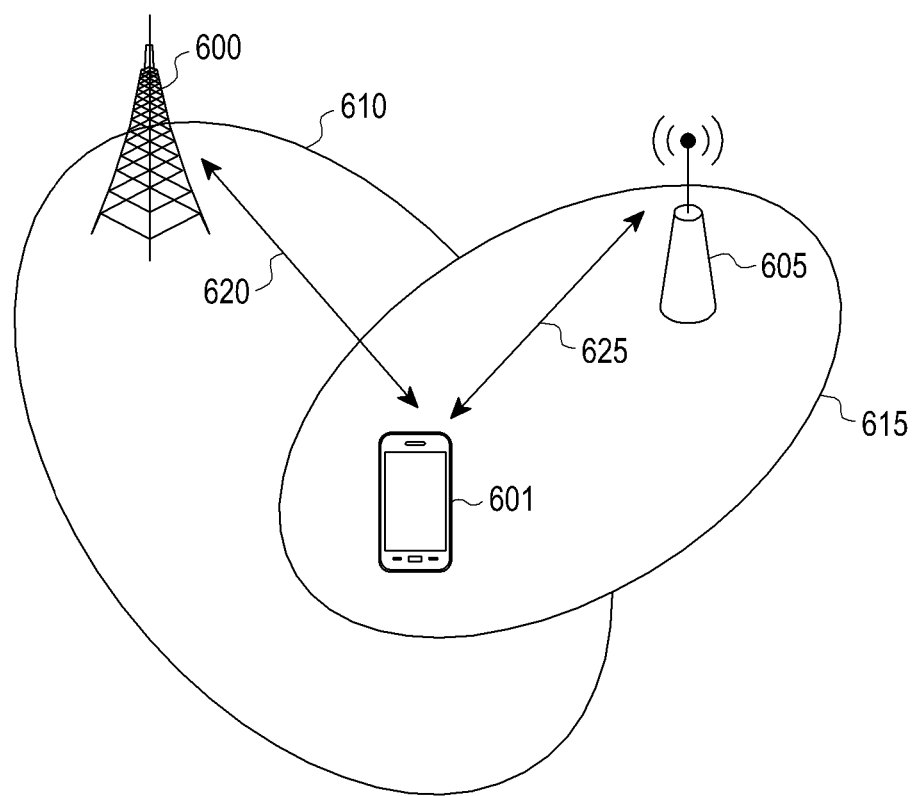
FIG. 6 is a diagram of an electronic device in a wireless network environment including a base station and an access point (AP), according to an embodiment of the present disclosure.

FIG. 6 is a diagram of an electronic device in a wireless network environment including a base station and an AP, according to an embodiment of the present disclosure.

A base station 600 may be an entity communicating with an electronic device 601, which may be denoted a BS, nodeB (NB), eNodeB (eNB), or small cell. LTE base stations using an unlicensed band are described below. Thus, the base station 600 may be referred to as an LAA eNB. Unlicensed band Wi-Fi base stations may also be denoted APs 605.

The electronic device 601 may be an entity communicating with the base station 600, which may be referred to as a user equipment (UE), mobile station (MS), mobile equipment (ME), device, or terminal. Electronic devices using an unlicensed band are described below. Thus, the electronic device 601 may be referred to as an LAA UE.

The electronic device 601 may be located within LAA coverage and Wi-Fi coverage 615. Thus, the electronic device 601 may communicate 625 with an AP 605 that is in charge of Wi-Fi coverage 615 while communicating 620 with the base station 600 that is in charge of LAA coverage 610. Since the unlicensed frequency band is supposed to be shared with other RATs within the LAA coverage 610 overlapping the Wi-Fi coverage 615, the frequency band cannot exclusively be used. Thus, the base station 600 should determine whether the corresponding frequency band is available through listen before talk (LBT), and the base station 600 may support the electronic device 601 through the unlicensed band frequency. To that end, the base station 600 may continue to search for frequencies or channels free from the AP 605 by periodically monitoring another frequency band, i.e., available frequency band, within the unlicensed band at each cycle (e.g., 10 seconds). In congested regions, however, since many Wi-Fi APs are around the electronic device 601, the frequency bands used by the APs and the frequency band intended to use by the base station 600 may be very close or overlap. As such, even when the base station 600 continues to monitor the unlicensed band, the base station 600 and the AP 605 may use the same or close frequencies.

As described above, two RATs being simultaneously used (or where either one is used) may arise depending on wireless environments, such as a position of the electronic device 601, whether Wi-Fi function is activated, or an amount of data transmitted/received. Where two RATs are put to use, the frequency bands in the unlicensed band that each RAT intends to use may overlap each other.

The following description focuses on when the electronic device 601 receives data from the base station 600 and transmits/receives data with the AP 605, which corresponds to an unlicensed band Wi-Fi base station under the assumption of downlink. It should be, however, noted that the methods proposed herein may also apply to uplink transmission. For example, in release-14, uplink operation is also rendered possible as eLAA. However, the LAA operation on the electronic device 601, when applied to uplink operation, may be determined as per instructions from the base station 600.

Figure 7:
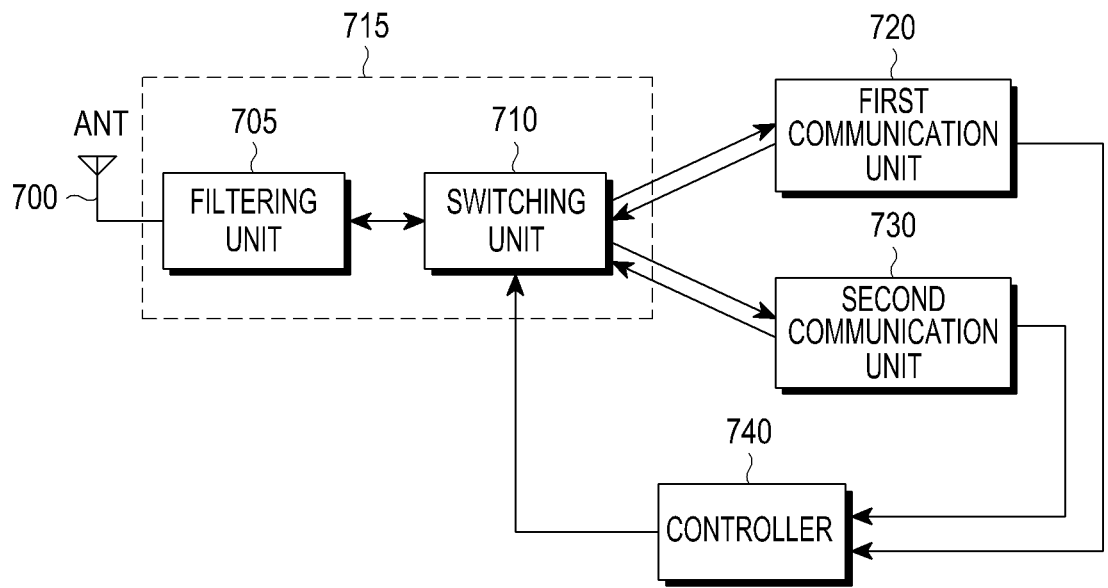
FIGS. 7 and 8 are block diagrams of an electronic device in which different communication technologies may share an unlicensed band, according to an embodiment of the present disclosure.
Figure 8:
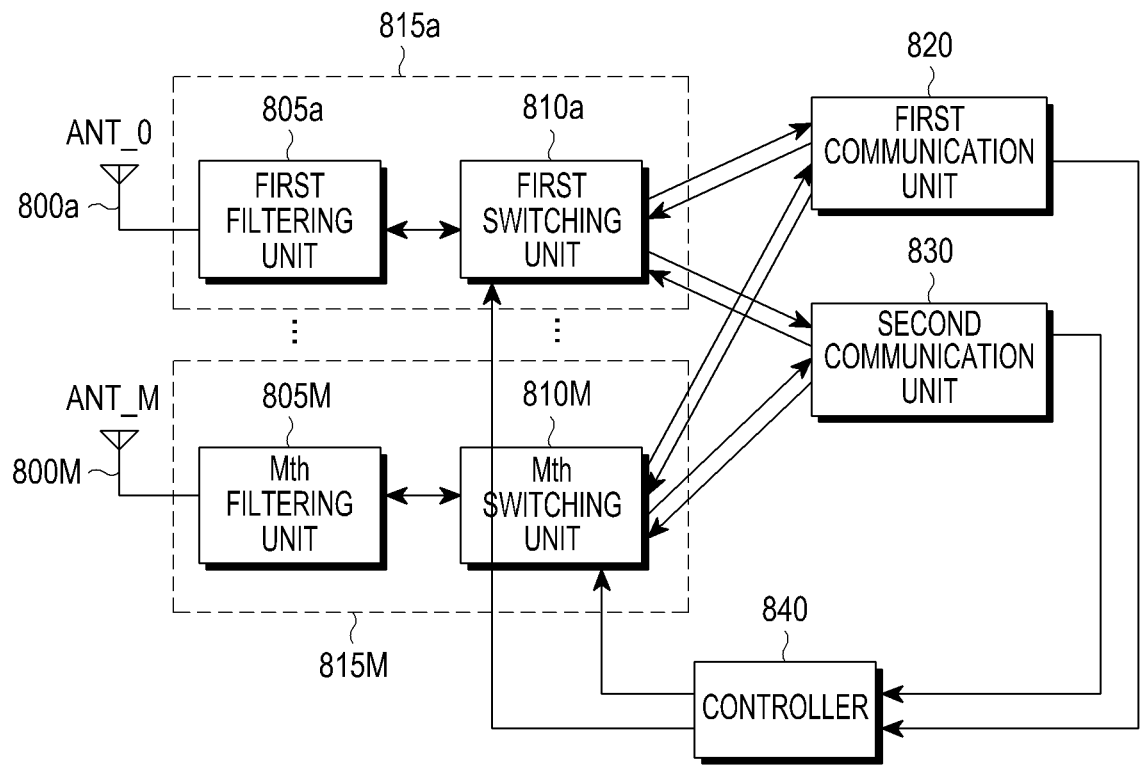

FIGS. 7 and 8 are block diagrams of an electronic device in which different communication technologies may share an unlicensed band, according to an embodiment of the present disclosure.

An electronic device for allowing different communication technologies to share an unlicensed band may include an antenna 700, a filtering unit 705, a switch unit 710, a first communication unit 720, a second communication unit 730, and a controller 740 (or a control circuit or the processor 210). The filtering unit 705 and the switching unit 710 may be components included in a front end module 715.

The antenna 700 is an antenna that may communicate on a designated band, and one or more antennas may be deployed. The antenna 700 may be an antenna supporting an unlicensed band, and two antennas may be used for Wi-Fi communication on the unlicensed band.

The filtering unit 705 may filter signals received from the antenna 700, and the filtering unit 705 may filter a particular portion of the unlicensed band utilizing a band pass filter (BPF). Therefore, where two or more signals are simultaneously received from the antenna 700, the filtering unit 705 may filter out two or more bands. As such, the filtering unit 705 may split the frequencies in the unlicensed band. The filtering unit 705 may be a duplexer or diplexer.

The switching unit 710 may form a path to connect the signals filtered out to the two or more bands through the filtering unit 705 to correspond to the first communication unit 720 and second communication unit 730. The switching unit 710 may serve as a path to connect the signal of each frequency band in the unlicensed band to its respective corresponding communication unit under the control of the controller 740. Thus, the switching unit 710 may form a transmission path from each communication unit 720 and 730 to the antenna 700, as well as a reception path from the antenna 700 to each communication unit 720 and 730.

The switching unit 710 may be a multiple pole multiple throw (MPMT) switch.

The switching unit 710 may include first multiple ports (e.g., input ports) connected with the filtering unit 705 and second multiple ports (e.g., output ports) for transmitting and/or receiving signals with the first communication unit 720 and/or the second communication unit 730. The number of second multiple ports of the switching unit 710 may be larger than the number of first multiple ports.

The first communication unit 720 may be a communication unit supporting a first communication function using a frequency of the unlicensed band, and the first communication unit 720 may be a communication module (e.g., the communication module 220) or communication modem (e.g., the cellular module 221). The first communication unit 720 may be an LAA module performing an LAA function supporting the unlicensed band.

The second communication unit 730 may be a communication unit supporting a second communication function sharing the unlicensed band with the first communication unit 720. The second communication unit 730 may be a Wi-Fi module 223 performing a Wi-Fi function. The first communication unit 720 and the second communication unit 730 may support different RATs.

The controller 740 (e.g., the processor 210) may be electrically connected with the switching unit 710, the first communication unit 720, and the second communication unit 730. The controller 740 may control the switching unit 710 to form a connection path between the first communication unit 720 and the antenna 700 for a signal for the first communication function, and the controller 740 may control the switching unit 710 to form a connection path between the second communication unit 720 and the antenna 700 for a signal for the second communication function. The signal for the first communication function may be a data signal for LAA, and the signal for the second communication signal may be a data signal for Wi-Fi.

The path of a signal received through the antenna 700 is formed when a signal of a first band in the unlicensed band is outputted through the switching unit 710 to the first communication unit 720, and the controller 740 may control the switching unit 710 so that a signal of a second band in the unlicensed band is outputted to the second communication unit 730.

The path of a signal transmitted through the antenna 700 is formed when the controller 740 performs control so that a signal output from the first communication unit 720 is output to the outside through the antenna 700 as the signal of the first band in the unlicensed band through the switching unit 710, and the controller 740 may perform control so that a signal output from the second communication unit 730 is output to the outside through the antenna 700 as the signal of the second band in the unlicensed band through the switching unit 710.

The electronic device may further include a low-noise amplifier that amplifies a signal output from the switching unit 710 and outputs the amplified signal to each of the first communication unit 720 and the second communication unit 730. Or, the electronic device may further include a power amplifier that amplifies a signal output from at least one of the first communication unit 720 and the second communication unit 730 and outputs the amplified signal to the switching unit 710.

A number of pairs of filtering units 805*a* and switching units 810*a* may be the same as the number of antennas as shown in FIG. 8.

The front end module 815*a* may include a filtering unit 805*a* and switching unit 810*b* (or multiples of each of these devices). The number of front end modules may be the same as the number of antennas. For example, where there are two antennas used for Wi-Fi controller on the unlicensed band, the same number of filtering units as the number of antennas and the same number of switching units as the number of antennas may be deployed. When there are a plurality of antennas supporting the unlicensed band, the antennas 800*a*, . . . , 800M are connected with filtering units 805*a*, . . . , 805M, respectively, and the filtering units 805*a*, . . . , 805M may be connected with the switching units 810*a*, . . . , 810M, respectively. Thus, when there are a plurality of antennas, there may be a plurality of front end modules 815*a*, . . . , 815M corresponding to the number of the antennas.

Where there are a plurality of RATs that may support the unlicensed band in the electronic device, the electronic device may include a communication unit in addition to the first communication unit 720 or 820 and the second communication unit 730 or 830. In other words, the electronic device may further include communication units corresponding to the number of RATs. Thus, even where the number of antennas is smaller than the number of RATs supporting the unlicensed band (e.g., when the number of antennas is two, and the number of RATs is three), signals of a plurality of bands in the unlicensed band may be output though the filtering units and may be output through the switching units to the RATs, so that each RAT may simultaneously be used where the number of antennas is smaller than the number of RATs.

As described above, the GHz Wi-Fi antenna may be shared in the electronic device without the need for additionally providing a 5 GHz antenna. Thus, a bundle may be made on upper layers in multi-path transmission control protocol (MPTCP) utilizing 1 Gbps (LTE)+1 Gbps (Wi-Fi 802.11AC), achieving a final data reception speed of 2 Gbps.

As shown in FIGS. 7 and 8, an electronic device includes at least one antenna for communication on a designated band, at least one filtering unit filtering signals received from the antenna into a plurality of bands in the designated band, at least one switching unit outputting the signals filtered by the filtering unit to a first communication unit using a first communication function and a second communication unit using a second communication function, and a processor (e.g., the controller 740 or the processor 210) electrically connected with the switching unit, the first communication unit, and the second communication unit to control the switching unit so that, when a signal of a first band in the designated band is output to the first communication unit, a signal of a second band in the designated band is output to the second communication unit. The designated band may be a 5 GHz band in an unlicensed band.

The switching unit may be a multiple pole multiple throw (MPMT) switch. The switching unit may include first multiple ports connected with the filtering unit and second multiple ports for transmitting and/or receiving signals with the first communication unit and the second communication unit, and the number of the second multiple ports may be larger than the number of the first multiple ports. The filtering unit may be a duplexer or a diplexer.

The processor may determine a band corresponding to the first communication unit and a band corresponding to the second communication unit among the plurality of bands based on communication-related information provided from the first communication unit and the second communication unit and control the switch to output each of the determined bands of signals to a respective one of the first communication unit and the second communication unit. The communication-related information may include at least one of information about a frequency being currently used, a data transmission and/or reception state, whether the first communication function and the second communication function are active, and the amount of data.

When the number of the at least one antenna is two or more, the number of the at least one filtering unit and the number of the at least one switching unit each may be two or more so that each of the at least one filtering unit corresponds to a respective one of the at least one antenna and each of the at least one switching unit corresponds to a respective one of the at least one antenna.

When the signal of the first band of signal is output to the first communication unit, the processor may control the switching unit to transmit a transmission signal from the second communication unit using a frequency of the second band.

When a frequency band used in the first communication unit at least partially overlaps a frequency band used in the second communication unit, the processor may induce any one of the first communication unit and the second communication unit to use a different frequency band.

Upon receiving a message to configure a measurement for the second band in the designated band from a base station corresponding to the first communication unit, the processor may determine whether the signal of the second band is being used in the second communication unit, and when the signal of the second band is being used in the second communication unit, the controller may perform control to transmit a measurement report message including information for preventing the base station from configuring the second band.

Figure 9:
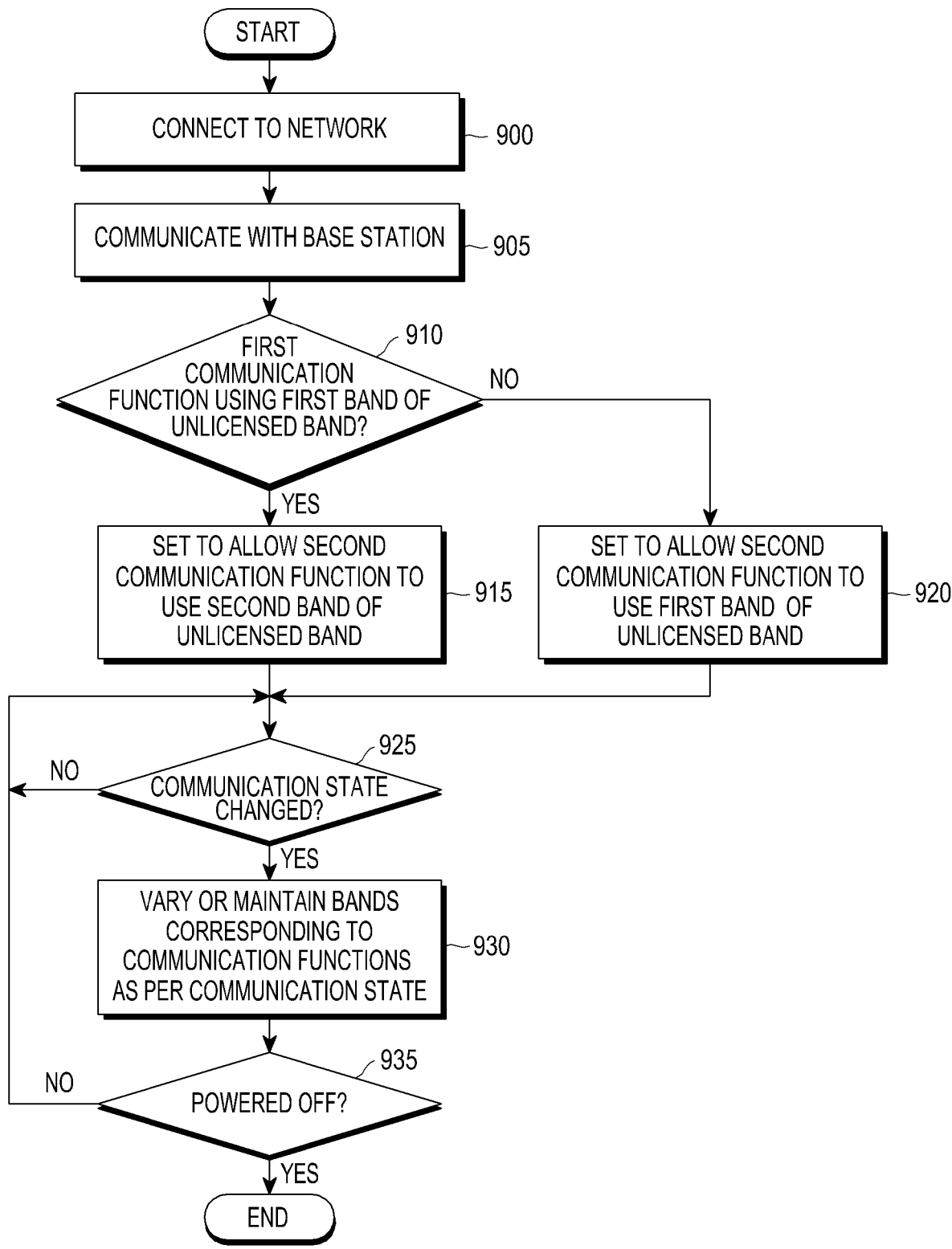
FIG. 9 is a flowchart of a method of an electronic device for enabling different communication technologies to share an unlicensed band, according to an embodiment of the present disclosure.

FIG. 9 is a flowchart of a method of an electronic device for enabling different communication technologies to share an unlicensed band, according to an embodiment of the present disclosure.

Upon accessing a network in operation 900, the electronic device 601 (or the controller 740 or processor 210) may communicate with a base station in operation 905. For example, the electronic device 601 may access an LAA communication network to communicate with the LAA base station. Or, the electronic device 601 may access a Wi-Fi network to communicate with an AP. The electronic device 601 may determine whether a communication function is using a first band of an unlicensed band in operation 910. When the first communication function is using the first band of the unlicensed band in operation 910, the electronic device 601 may make settings so that a second communication function uses a second band of the unlicensed band in operation 915. In contrast, unless the first communication function is using the first band of the unlicensed band in operation 910, the electronic device 601 may make settings so that the second controller function uses the first band of the unlicensed band in operation 920.

Upon entry of a command to turn on the Wi-Fi function of the electronic device 601 from the user while performing LAA communication using the first band frequency on the electronic device 601, a signal for LAA communication and a signal for Wi-Fi communication may simultaneously be received using function bands in the unlicensed band. As such, when LAA communication and Wi-Fi communication are used at the same time, the electronic device 601 may make settings so that communication is performed using a different band per communication function. Accordingly, when the electronic device 601 is performing LAA communication using the first band frequency, the Wi-Fi communication function may be set to use a second band frequency.

The electronic device 601 may determine whether the communication state is varied in operation 925. The electronic device 601 may determine whether the communication state is varied based on communication-related information provided from each communication unit 720, 820, 730, and 830. The communication-related information may include at least one of information about the frequency being currently in use, data transmission/reception circumstance (or information), whether the first communication function and second communication function are activated, and the amount of data transmitted/received.

When the communication state is determined to be varied in operation 925, the electronic device 601 may maintain or vary the band corresponding to each communication function depending on the communication state of operation 930. When the communication state is varied may include when the use of the first band or second band in the unlicensed band is stopped or when the function bands used in the first communication function or second communication function are varied. As long as the electronic device 601 is not powered off in operation 935, the electronic device 601 may return to operation 925 to repeat the above-described operations.

The electronic device includes filtering signals received from one or more antennas for communication on a designated band into signals of two or more bands and performing switching so that, upon outputting a signal of a first band of the two or more bands to a first communication unit using a first communication function, a signal of a second band of the two or more bands is output to a second communication unit using a second communication function. The designated band may be a 5 GHz band in an unlicensed band.

The switching may use an MPMT switch including first multiple ports for receiving the filtered signals and second multiple ports for transmitting and/or receiving signals for the first communication function and/or the second communication function, and wherein the number of the second multiple ports is larger than the number of the first multiple ports.

The filtering may use a duplexer or a diplexer.

The electronic device may determine a band corresponding to each of the first communication unit and the second communication unit among the two or more bands based on communication-related information provided from the first communication unit and the second communication unit. The communication-related information may include at least one of information about a frequency being currently used, a data transmission/reception state, whether the first communication function and the second communication function are active, and the amount of data transmitted/received.

While performing the first communication function using the signal of the first band and the second communication function using the signal of the second band, the electronic device may temporarily perform switching so that the signal of the second band used in the second communication function is used in the first communication function when the first communication function performs wireless environment monitoring.

The electronic device may perform switching to form a transmission path from the second communication unit to the antenna or a reception path from the antenna to the second communication unit corresponding to a signal transmission operation or reception operation of the second communication unit.

When a frequency band used in the first communication unit at least partially overlaps a frequency band used in the second communication unit, the electronic device may induce any one of the first communication unit and the second communication unit to use a different frequency band.

Upon receiving a message to configure a measurement for the second band in the designated band from a base station corresponding to the first communication unit, the electronic device may determine whether the signal of the second band is being used in the second communication unit, and when the signal of the second band is being used in the second communication unit, the controller may perform control to transmit a measurement report message including information for preventing the base station from configuring the second band.

Figure 10:
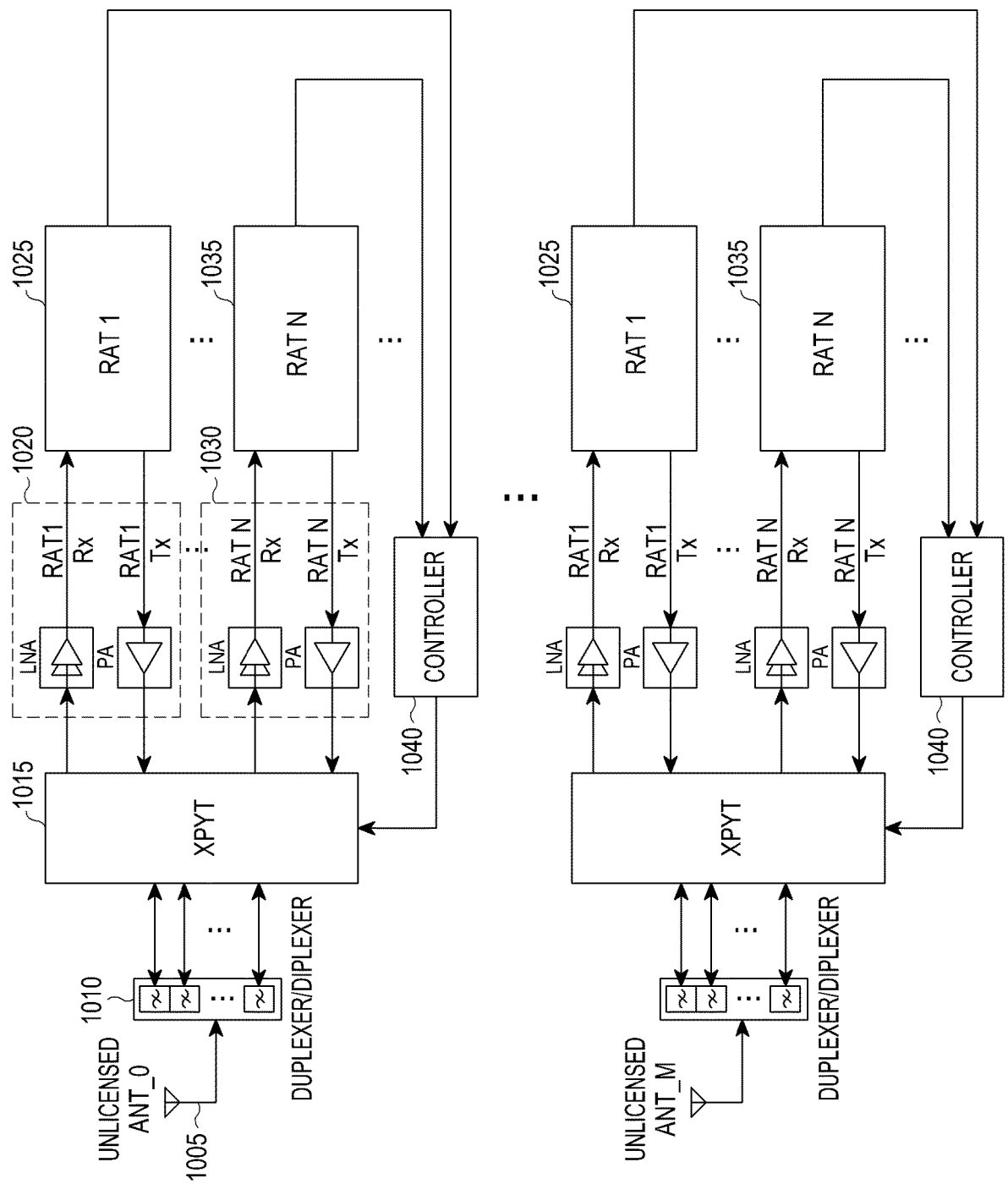
FIG. 10 is a block diagram of an internal configuration of an electronic device for using a plurality of RATs, according to an embodiment of the present disclosure.

FIG. 10 is a block diagram of an internal configuration of an electronic device for using a plurality of RATs, according to an embodiment of the present disclosure.

An example of a filtering unit connected with an antenna 1005 for communication on an unlicensed band may include a duplexer or diplexer. Since the filtering unit may include a duplexer or diplexer, the duplexer or diplexer may be denoted 'duplexer/diplexer' as shown in FIG. 10. The duplexer/diplexer 1010 may be configured to split the unlicensed band (e.g., a 5 GHz band) into two or more bands. When the duplexer/diplexer 1010 includes, e.g., a 5 GHz band pass filter (BPF), it may split the unlicensed band into a UNII Band 1 and a UNII Band 3.

FIG. 10 illustrates a switching unit that is an x pole y throw (XPYT) 1015.

The XPYT 1015 may be a hardware component obtained by normalizing a single pole double throw (SPDT). The switching unit may be implemented as an XPYT or multiple pole multiple throw (MPMT). The XPYT may include X poles and Y throws. Here, X may refer to the number of poles to which the switch may move or the number of separate circuits that the switch may control. For example, a four-pole switch may include a switch capable of separately or individually controlling four different circuits. Y may denote the number of lines that are switched, i.e., the number of contacts that are to be influenced by switching once (one movement of the pole). Similarly, the MPMT may include a plurality of poles along with a plurality of throws. The number of throws may be larger than the number of poles.

The XPYT 1015 may be operated under the control of a controller 1040. The controller 1040 may control the switching of the XPYT 1015 so that each of signals filtered via the antenna 1005 and the duplexer/diplexer 1010 is connected to its respective corresponding RAT, given the frequencies used in the communication units, e.g., RAT 1 1025, . . . , RAT N 1035. In other words, connection paths 1020 and 1030 may be formed along which signals filtered fitting the frequency bands used in the RATs 1025, . . . , 1035 are delivered to the RATs 1025, . . . , 1035 under the control of the controller 1040. As such, the controller 1040 may control the XPYT 1015 to form a transmission path 1020 or reception path 1030 between the RATs 1025, . . . , 1035 corresponding to a signal transmission operation or reception operation on each RAT 1025, . . . , 1035. For example, the transmission/reception path 1020 between the XPYT 1015 and RAT 1 1025 may be a path along which the first band frequency signal filtered in the unlicensed band is transmitted and received, and the transmission/reception path 1030 between the XPYT 1015 and RAT N 1035 may be a path along which the second band frequency signal filtered in the unlicensed band is transmitted and received. The transmission paths 1020 and 1030 may be configured identically to each other.

Transmission/reception paths between the XPYTs 1015 and RATs may be formed corresponding to the number of frequency band signals filtered by the duplexer/diplexer 1010. When signals are split to have two bands by the duplexer/diplexer 1010, which splits two signals to have two bands are output, the two bands of signals may be used in different RATs, and when each RAT supports transmission and reception, two transmission/reception paths may be formed per RAT through the XPYT 1015, thereby forming four transmission/reception paths. As described above, there may be determined corresponding duplexers/diplexers and XPYTs based on the number of RATs supporting the unlicensed band in the electronic device.

Corresponding to two or more antennas ANT_0, . . . , ANT_M, a duplexer/diplexer other than the duplexer/diplexer 1010 may be configured corresponding to each antenna, and accordingly, one XPYT may be connected to each duplexer/diplexer. However, although FIG. 10 illustrates an example in which there are a plurality of RAT 1's 1025, a plurality of RAT N's 1035, and a plurality of controllers 1040, this is merely for illustrative purposes, and the same reference number may be used to indicate that they are the same type of components. That is, two or more XPYTs 1015 may be controlled by a single controller 1040.

Since different frequencies are used depending on network context related to each RAT 1025, . . . , 1035, the controller 1040 may map a necessary frequency band to each RAT 1025, . . . , 1035 considering the network context. The controller 1040 may control each RAT 1025, . . . , 1035, and as shown in FIG. 11, an RAT control module 1100 may control the RATs 1025, . . . , 1035.

Figure 11:
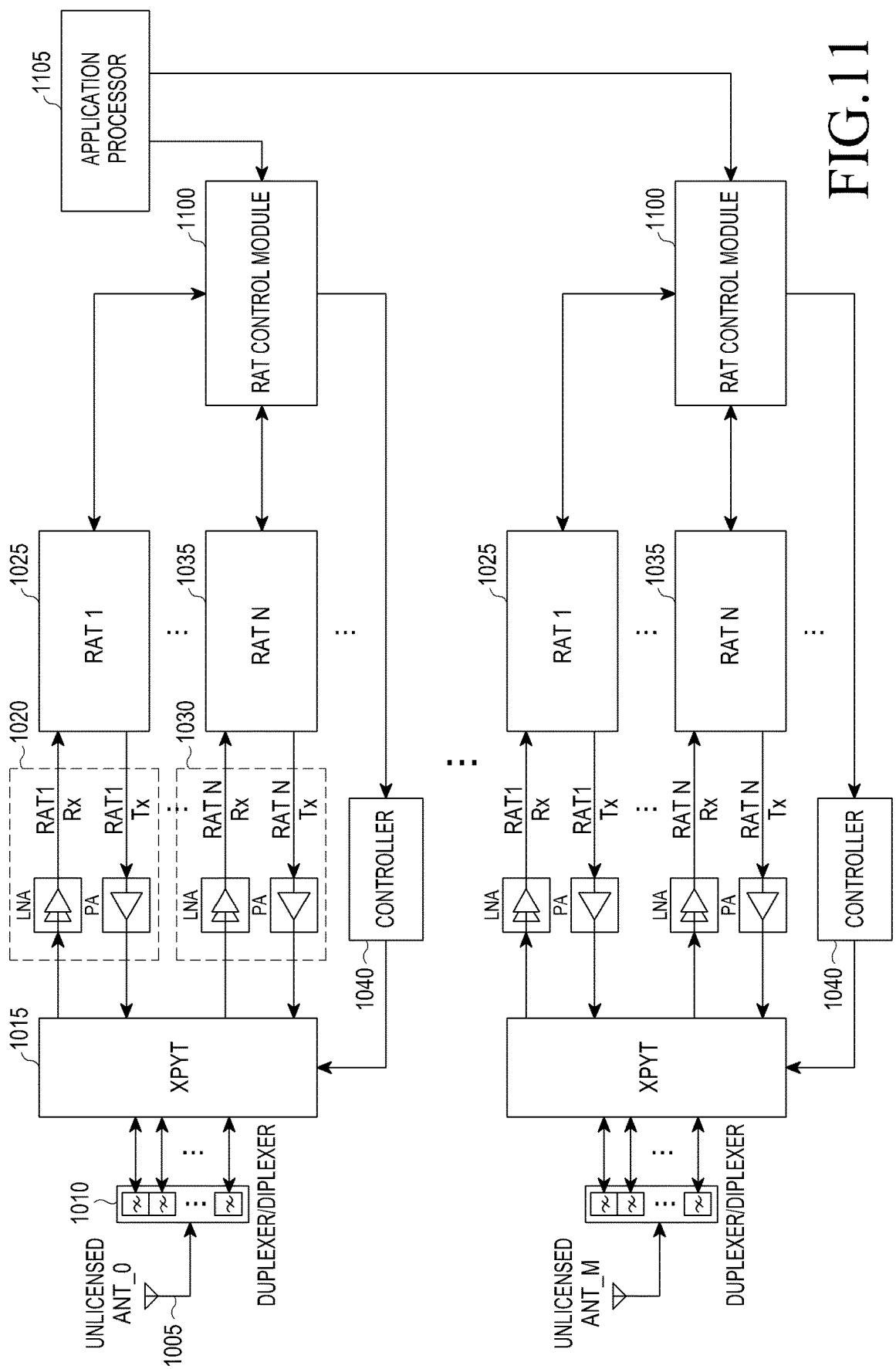
FIG. 11 is a block diagram of an internal configuration of an electronic device for using a plurality of RATs, according to an embodiment of the present disclosure.

FIG. 11 is a block diagram of an internal configuration of an electronic device for using a plurality of RATs, according to an embodiment of the present disclosure.

The RAT control module 1100 may control each RAT 1025, . . . , 1035, and the RAT control module 1100 may determine frequencies in the unlicensed band to show the maximum throughput in the current wireless environment. To that end, the RAT control module 1100 may receive communication-related information from an application processor 1105 and each RAT 1025, . . . , 1035 to determine a frequency band corresponding to each RAT based on the communication-related information. The RAT control module 1100 may obtain information about other RATs or Wi-Fi information from the AP 605 to determine which RAT is to use what frequency. A frequency band used per context of RAT may previously be determined.

Thereafter, the RAT control module 1100 may notify each RAT 1025, . . . , 1035 of the determined frequency band so that the determined RAT may use the determined frequency band, thereby instructing an operation to induce the corresponding RAT to use a determined function as per each protocol. The operation to induce each RAT 1025, . . . , 1035 to use the determined frequency band may be performed by the RAT control module 1100 or the controller 1040.

As set forth above, the RAT control module 1100 provides information about the frequency band determined per RAT to the controller 1040 and the controller 1040 controls the XPYT 1015, and the operation of the RAT control module 1100 may be performed by the controller 1040. Further, the RAT control module 1100 may be positioned on a radio interface layer or present in a modem (e.g., the RAT 1025) supporting a particular RAT. The RAT control module 1100 may be included in a processor 210. There may be as many RAT control modules 1100 as the number of RATs that are implemented, and signals from one or more RAT control modules 1100 may be input to one controller 1040 (or the processor 210). One or more RAT control modules may be included in the processor.

Figure 12A:
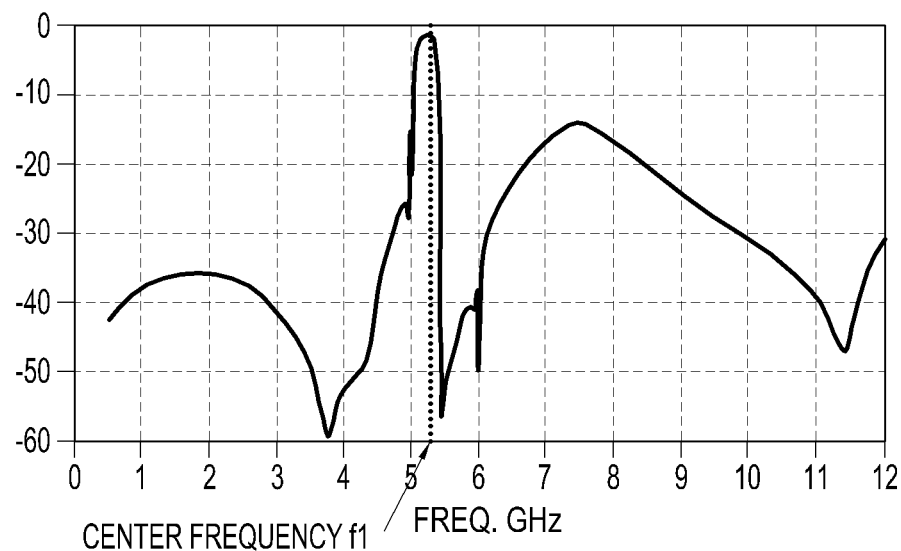
FIGS. 12A to 12C are graphs of a signal output from a filtering unit, according to an embodiment of the present disclosure.
Figure 12B:
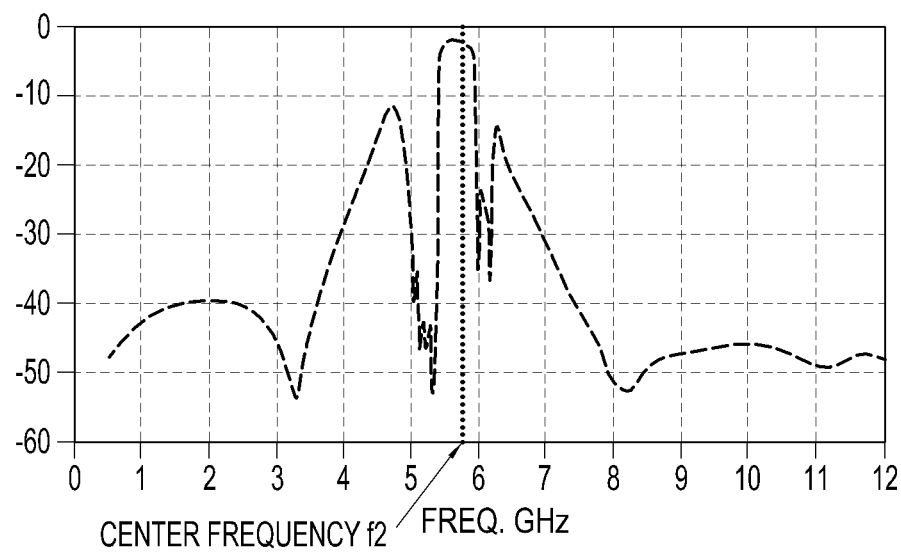
Figure 12C:
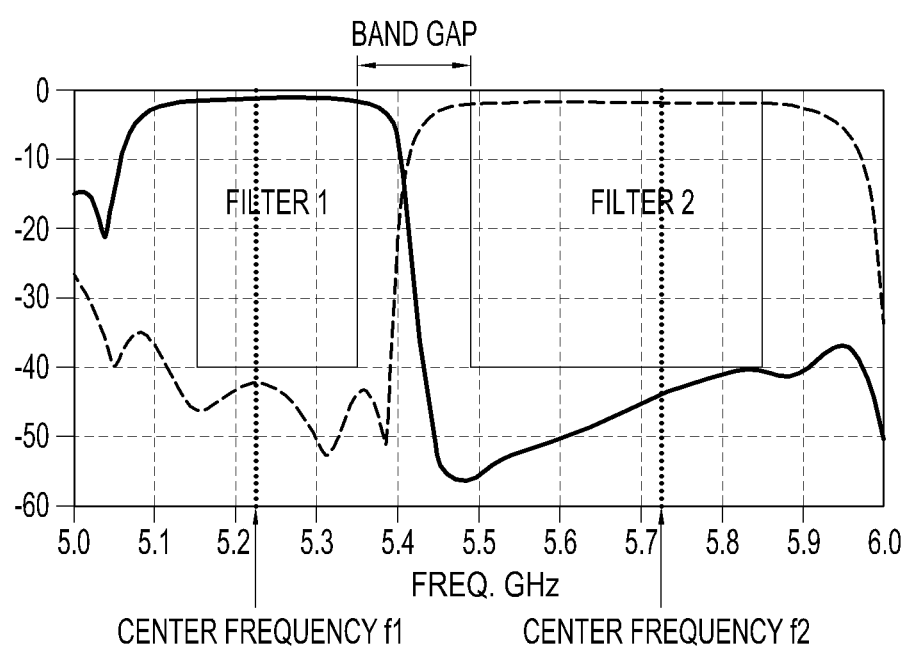

FIGS. 12A to 12C are graphs of a characteristic of a signal output from a filtering unit, according to an embodiment of the present disclosure.

Where a signal with center frequency f1 (FIG. 12A) and a signal with center frequency f2 (FIG. 12B) are received through an antenna, the signal with center frequency f1 may be filtered through a filter 1, and the signal with center frequency f2 may be filtered through a filter 2 (FIG. 12C).

Figure 13A:
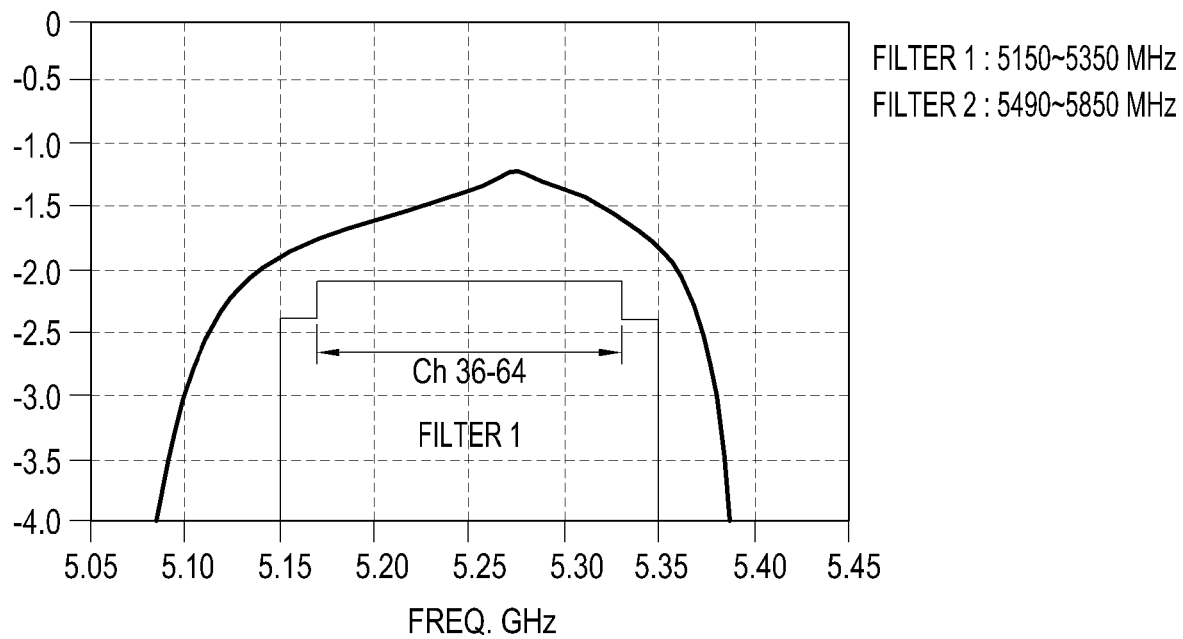
FIGS. 13A to 13B are graphs of a filtered signal shown in FIGS. 12A to 12C, according to an embodiment of the present disclosure.
Figure 13B:
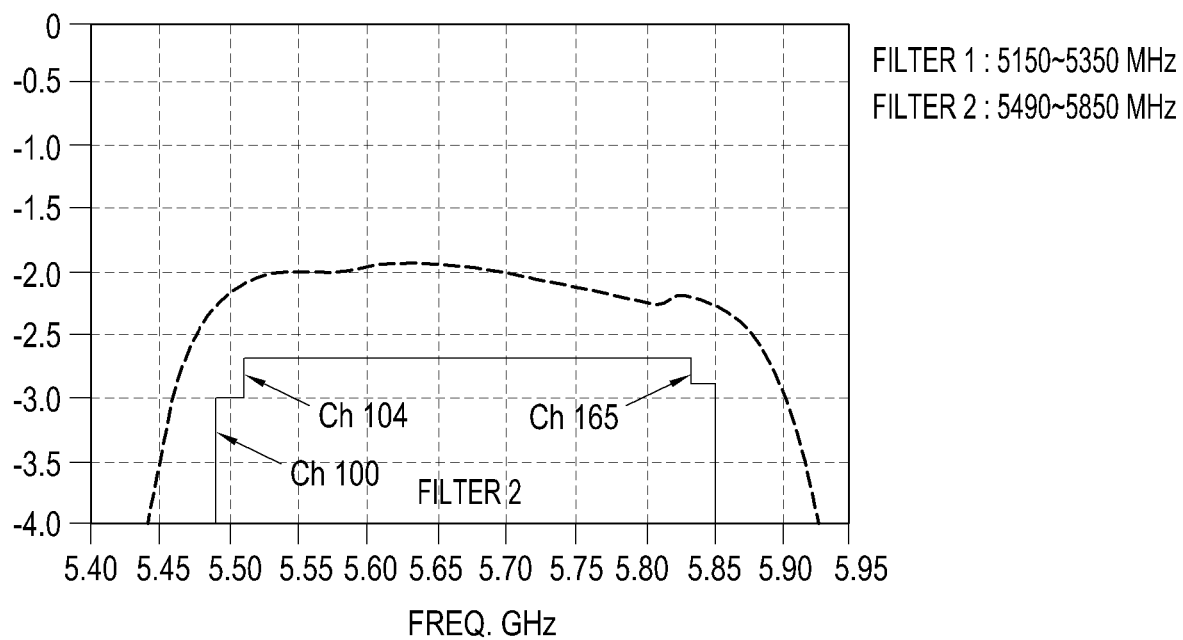

For example, assuming that center frequency f1 of FIG. 12A is 5.25 GHz, and center frequency f2 of FIG. 12B is 5.72 GHz, the signals may be split for their respective bands through the filter 1 of 5150 MHz to 5350 MHz and the filter 2 of 5490 MHz to 5850 MHz, as shown in FIGS. 13A to 13B. Thus, although signals are simultaneously received on the unlicensed band (e.g., 5 GHz), the signals may be separated from each other according to their bands.

Processing the signals separated per band from each other to correspond to each communication function is described with reference to FIGS. 14 and 15.

Figure 14:
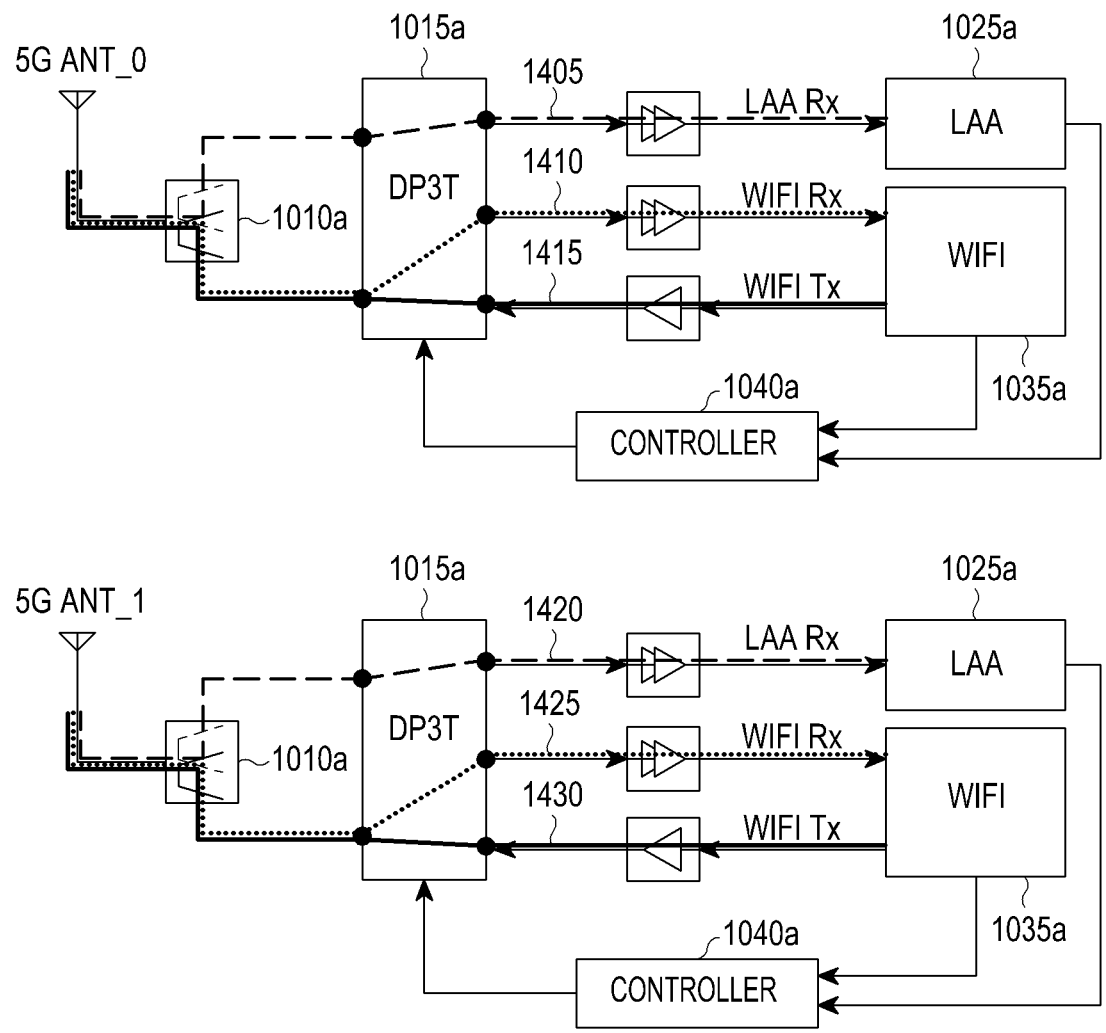
FIGS. 14 and 15 are diagrams of mapping a first-band signal and a second-band signal to an LAA function and a Wi-Fi function, respectively, according to an embodiment of the present disclosure.
Figure 15:
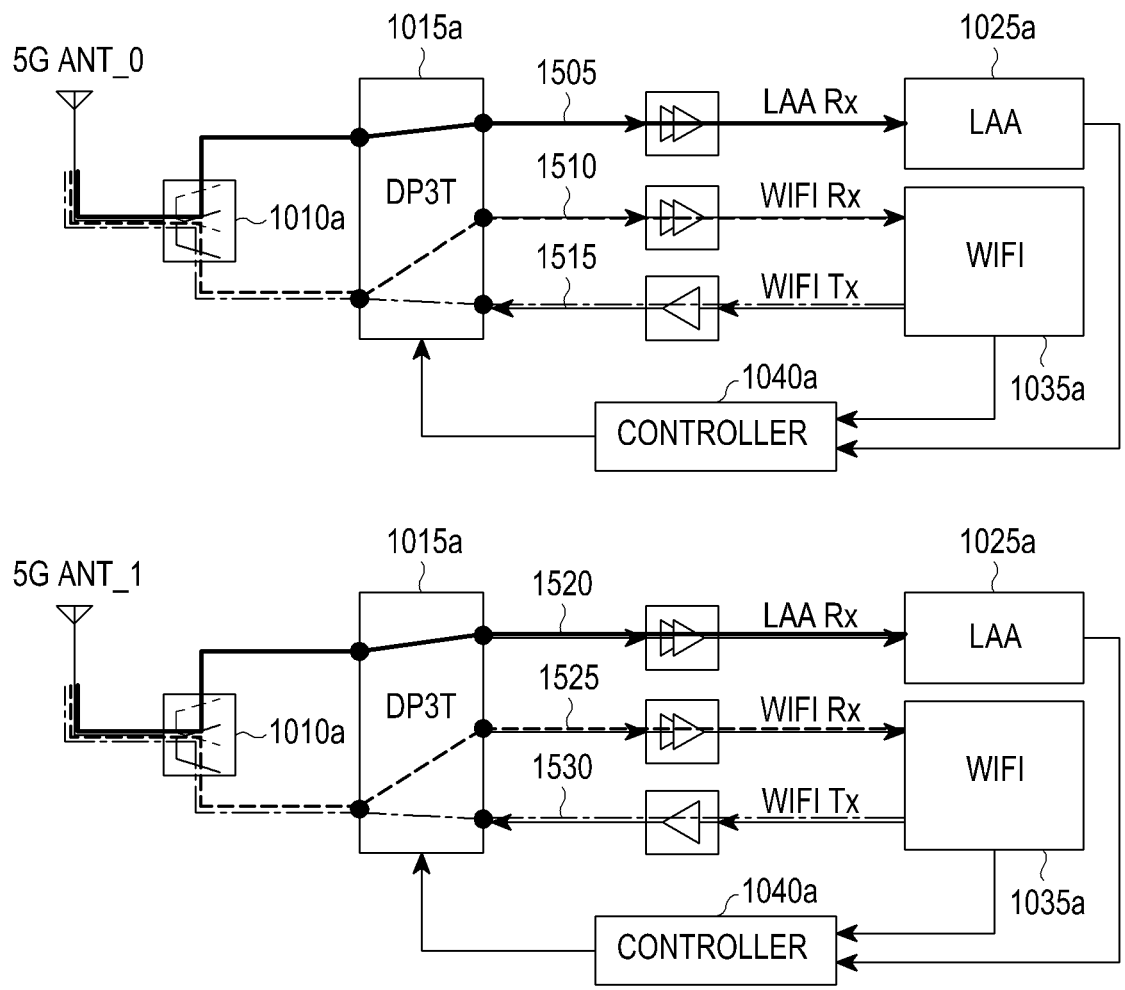

FIGS. 14 and 15 are diagrams of mapping a first-band signal and a second-band signal to an LAA function and a Wi-Fi function, respectively, according to an embodiment of the present disclosure.

FIG. 14 shows a filtering unit 1010a for separating signals received through a 5 GHz antenna 5G ANT_0 into two bands and a double pole triple throw (DP3T) 1015a as a switch.

The DP3T 1015a is a switch that includes two input ports and three output ports. The DP3T 1015a may form a connection path to allow two frequency bands filterable under the control of the controller 1040a to their respective corresponding RATs, e.g., an LAA 1025a and a Wi-Fi 1035a.

A controller 1040a may perform control so that the two frequency bands each match one RAT through the DP3T 1015a considering the use frequency of the LAA 1025a and the use frequency of the Wi-Fi 1035a. The Wi-Fi 1035a enables transmission Tx and reception Rx, the LAA 1025a enables reception Rx because transmission under LTE-U or Rel-13 LAA is being presumably used. Thus, since two poles corresponding to the two frequency bands are provided, and three throws corresponding to the transmission Tx and reception Rx of the Wi-Fi 1035a and the reception Rx of the LAA 1025a are provided, FIG. 14 illustrates the DP3T 1015a is used as switch. However, since LTE-U or Rel-13 LAA is described as an example, if eLAA is used, the LAA 1025a may also enable transmission Tx.

When the Wi-Fi 1035a is matched to use the frequency band signal of FIG. 13B, and the LAA 1025a is matched to use the frequency band signal of FIG. 13A, the frequency band signal of FIG. 13A may be delivered to the LAA 1025a along the LAA Rx path 1405. In contrast, the frequency band signal of FIG. 13B may be delivered to the Wi-Fi 1035a along the Wi-Fi Rx path 1410. A signal output from the Wi-Fi 1035a may be transmitted along the Wi-Fi Tx path 1415 to an external AP 605 through the antenna 5G ANT_0 using the same frequency band.

There may be provided two antennas as used for Wi-Fi communication on the unlicensed band. An LAA Rx path 1420, a Wi-Fi Rx path 1425, and a Wi-Fi Tx path 1430 may likewise be formed in the same manner described above for signals transmitted or received through the antenna 5G ANT_1.

When the frequency necessary for the Wi-Fi 1035a and the frequency necessary for the LAA 1025a are separated as shown in FIGS. 13A and 13B, the controller 1040a may deliver the separated frequencies of signals to their respective corresponding LAA 1025a and Wi-Fi 1035a, based on information provided from the LAA 1025a and the Wi-Fi 1035a.

The controller 1040a may determine that the frequency necessary for the Wi-Fi 1035a and the frequency necessary for the LAA 1025a needs to vary based on the information provided from the LAA 1025a and the Wi-Fi 1035a. Thus, when the Wi-Fi 1035a is matched to use the frequency band signal of FIG. 13A, and the LAA 1025a is matched to use the frequency band signal of FIG. 13B, LAA Rx paths 1505 and 1520, Wi-Fi Rx paths 1510 and 1525, and Wi-Fi Tx paths 1515 and 1530 may be formed for signals transmitted and received through the antenna 5G ANT_0 and the antenna 5G ANT_1 as shown in FIG. 15.

As set forth above, when communication carriers limited for cellular bands require higher-level data transmission speeds (e.g., Gbps-grade data transmission speed), transmission methods utilizing an unlicensed band may be used to achieve a high data transmission speed even without purchasing an additional frequency band. Further, 5 GHz Wi-Fi antennas may be used to achieve Gbps-grade data transmission speeds without the need for adding 5 GHz band antennas.

Figure 16:
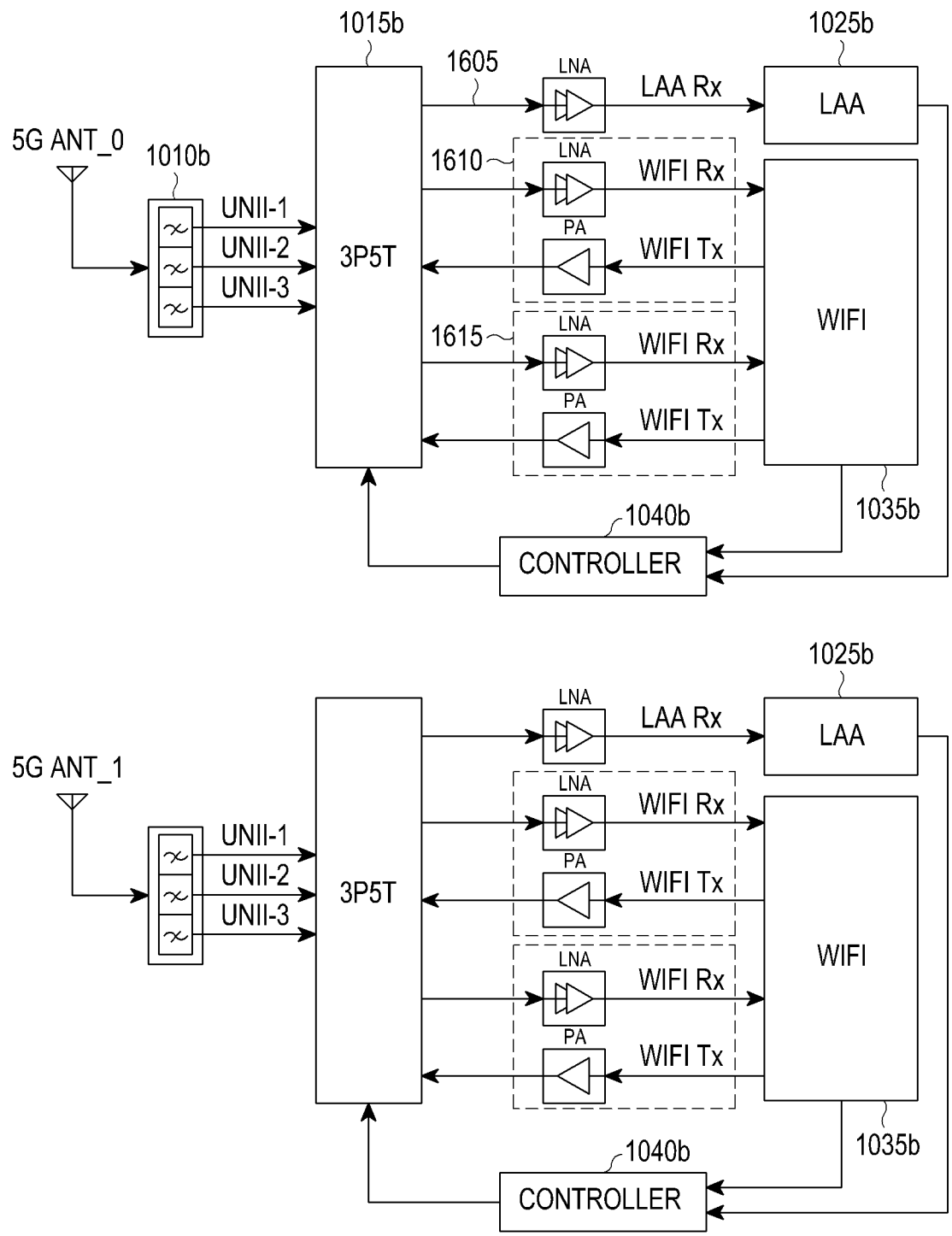
FIG. 16 is a diagram of mapping multiple bands of signals to an LAA function and a Wi-Fi function, according to an embodiment of the present disclosure.

FIG. 16 is a diagram of mapping multiple bands of signals to an LAA function and a Wi-Fi function, according to an embodiment of the present disclosure.

FIG. 16 illustrates an example in which two RATs use three frequency bands. A duplexer/diplexer 1010b may perform filtering per UNII band of the unlicensed band. The duplexer/diplexer 1010b may filter out per-band signals UNII-1, UNII-2, and UNII-3. When the switching unit is a 3P5T 1015b, five paths may be formed along which the three per-band signals are transmitted and received. In FIG. 16, when the LAA 1025b is configured to use any one 1605 of the UNII-1, UNII-2, and UNII-3 bands, the other two bands 1610 and 1615 are configured to be used by the Wi-Fi 1035b.

For example, after the controller 1040b performs matching so that the frequency suitable for Wi-Fi channel bonding may be used by the Wi-Fi 1035b, when the Wi-Fi 1035b bonds the UNII-1 and UNII-2 bands, the UNII-3 signal which is used by the LAA 1025b may also be bonded through the multi-path transmission control protocol (MPTCP).

The use of the MPTCP, which is a heterogeneous network bonding technique, enables bonding a Wi-Fi-based signal and an LAA-based signal that are transmitted individually. Use of CA, which bundles up two or more frequency bands of an unlicensed band, to increase speed as if a single frequency does, enables achieving a high transmission speed without Wi-Fi speed loss on the unlicensed band.

When the electronic device 601 supports both the Wi-Fi function and LAA function, although the AP 605 and the base station 600 communicate with the electronic device 601, they do not share information. Thus, the base station 600 and the AP 605 may use the same or close frequency. Accordingly, the electronic device 601 may determine what frequency in the unlicensed band is to be used for each of the Wi-Fi function and LAA function. When the frequency for the Wi-Fi function is already being used for the LAA function, the electronic device 601 can control the Wi-Fi function or the LAA function to use a different frequency, as described in detail with reference to FIG. 17.

Figure 17:
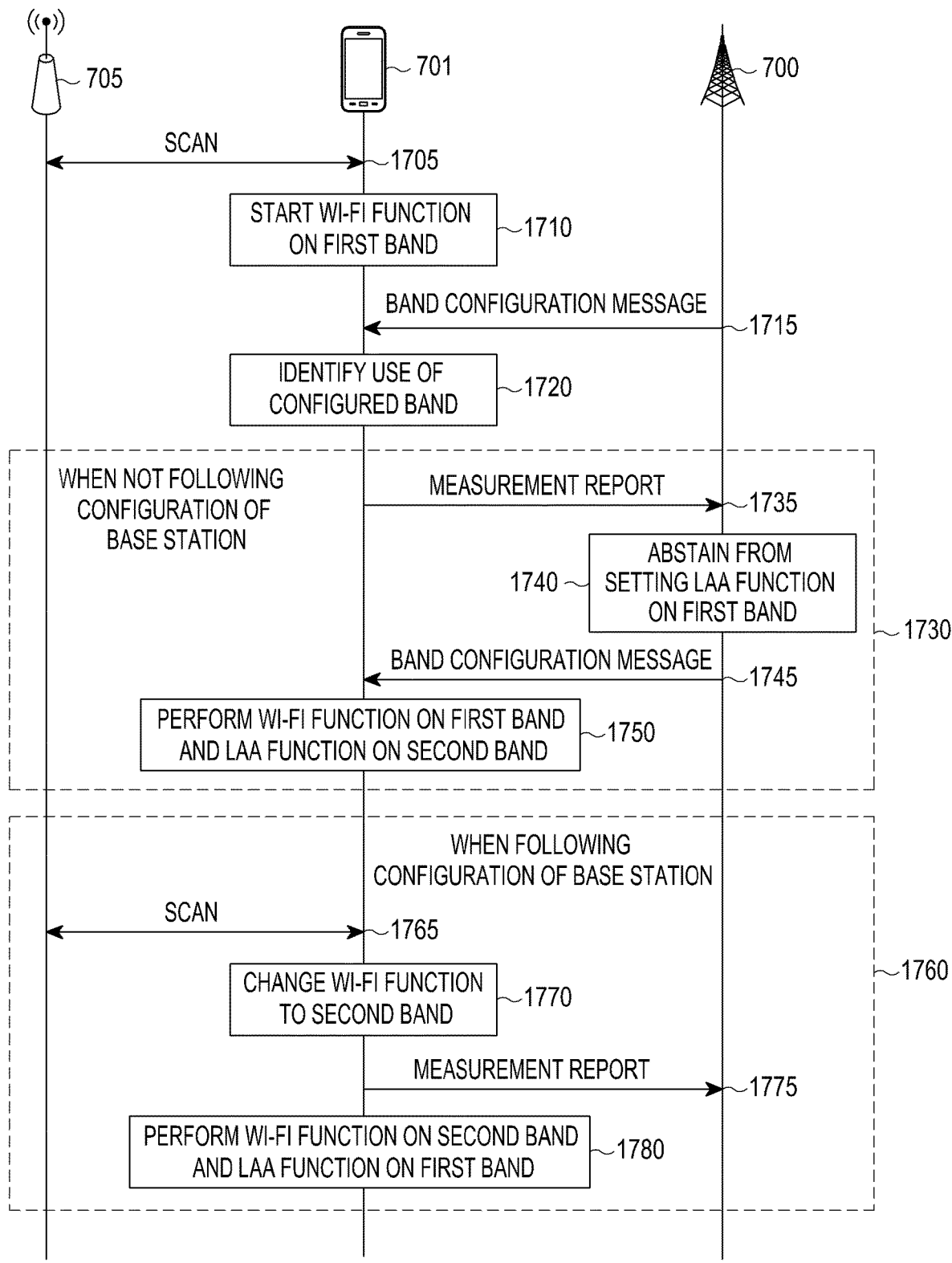
FIG. 17 is a flowchart of a method of an electronic device, a base station, and an AP for sharing an LAA function and a Wi-Fi function, according to an embodiment of the present disclosure.

FIG. 17 is a flowchart of a method of an electronic device, a base station, and an AP to share an LAA function and a Wi-Fi function, according to an embodiment of the present disclosure.

FIG. 18 is a diagram of a parameter used for selecting an AP on an electronic device, according to an embodiment of the present disclosure.

Referring to FIGS. 17 and 18, the electronic device 601 may scan Wi-Fi APs positioned in a vicinity of the electronic device 601 in operation 1705. For example, the electronic device 601 may broadcast probe request signals to start the scanning, and the electronic device 601 may receive a probe response signal from at least one of the APs receiving the probe request signals. The probe response signal may include parameters 1800 necessary to access the AP, e.g., a frequency bandwidth available for communication with the AP.

The electronic device 601 may select and access an AP based on the parameters 1800 received from the AP. Specifically, the Wi-Fi communication unit (or second communication unit 730 or 830) in the electronic device 601 may select an AP based on, a strength of received signal and channel quality (e.g., RSSI or SINR), available bandwidth information, whether 5 GHz AP or 2.4 GHz AP is available in the ambient environment, or network state information. The received signal strength and channel quality may represent a channel quality value including noise and the strength of a signal received from an ambient AP at the current location of the electronic device 601. The available bandwidth information may represent whether the corresponding AP may support channel bonding and the available maximum bandwidth. The 5 GHz AP or 2.4 GHz AP may be known by the SINR or RSSI and may indicate the number of APs accessible upon ambient scanning or the channel quality of each AP. The network state information is information contained in a beacon signal or probe response signal from the AP, and this information may represent the current network state that is sent from the AP to the electronic device 601. The electronic device 601 may select an AP based on any of the parameters shown in FIG. 18.

FIG. 18 illustrates IEEE 802.11-based BSS load parameters. 'Station count' may signify the number of electronic devices connected to the current AP, and 'channel utilization' may signify the ratio (0 to 255) in which the wireless channel is used. Here, 255 may signify that the wireless channel is 100% used.

Any one of the ambient APs may be selected considering the above-described parameters.

Referring again to FIG. 17, in operation 1710, the electronic device 601 may access the AP 605 to start the Wi-Fi function on the first band of the unlicensed band. The signal of the first band among the bands filtered accordingly may be used for the Wi-Fi function.

When the electronic device 601 supports the LAA function, the electronic device 601 may receive signals from the base station 600. In operation 1715, the electronic device 601 may receive a band configuration message from the base station 600. In operation 1720, the electronic device 601 may identify whether to use the band set by the base station 600. The band configuration message may be a message that configures a band to be used in the LAA function or a message that configures a frequency band to be measured.

Upon determining in operation 1720 that the band configured by the base station 600 is being already used in the Wi-Fi function, the electronic device 601 may transmit a measurement report to the base station 600 if the base station configuration is not followed in operation 1730. The measurement report transmitted from the base station 600 may contain measurement information to prevent the base station 600 from configuring the band being already in use for the LAA function. For example, the measurement report may include designated measurement information, such as setting a very low quality value, not actual quality measurement information, for the configured band. Alternatively, the electronic device 601 may send out measurement information in which the measurement value for a band other than the frequency band to be used in the electronic device 601, i.e., the band being already used, has been set high.

Although the measurement report message is used as an example of the message used to control the base station 600 to use a different frequency band, other types of messages can be used, such as messages related to measuring the quality of the electronic device 601 as sent out to the base station 600. For example, when the electronic device 601 performs signal strength/interference measurement on the LTE reference signal (RS) channel for the frequency when the frequency in the unlicensed band is already being used by the Wi-Fi function, the result of the signal strength/interference measurement on the channel can contain an error value. If this is reported to the base station 600, the base station 600 may perform wrong secondary cell (scell) addition/release or scell activation/deactivation based on the signal strength/interference measurement result of the electronic device 601 which contains the error value. For example, when the electronic device 601 is in the LAA scell addition and scell active state, the electronic device 601 may report a low channel quality indicator (CQI) value to the base station 600.

Accordingly, the base station 600 may be prevented from configuring the LAA function on the first band in operation 1740. Therefore, the base station 600 may send a band configuration message in which a different frequency band to be measured by the electronic device 600 has been configured to the electronic device 600 in operation 1745. Thus, the electronic device 601 may perform the LAA function on the second band while performing the Wi-Fi function on the first band in operation 1750.

An example is described above in which Wi-Fi scanning is first initiated to configure the first band for the Wi-Fi function, and a different frequency band is then induced for use in the base station 600.

Even upon entry of a command to turn on the Wi-Fi function by the user while communicating with the base station 600, the frequency band to be used in the base station 600 may be controlled to be changed to another frequency band in the above manner.

Upon determining in operation 1720 that the band configured by the base station 600 is being already used in the Wi-Fi function, the electronic device 601 may scan ambient APs in operation 1765 if the base station configuration is followed (in operation 1760). For example, when the band set by the base station 600 is the first band, the electronic device 600 may start to scan to find the AP using the second band, not the AP using the first band. At this time, in order for the Wi-Fi function to perform monitoring, such as scanning, switching may temporarily be made to allow the Wi-Fi function to use the first band signal to find the AP capable of supporting the frequency band (e.g., the second band) desired for the Wi-Fi function, even when the LAA function is performing data transmission/reception using the first band.

Such temporary switching may also happen upon wireless environment monitoring, e.g., measuring the quality of ambient signals, other than Wi-Fi scanning. Accordingly, in order for the first communication scheme to monitor the corresponding frequency, even when the second communication scheme is performing data transmission/reception when the first communication function performs wireless environment monitoring (such as measurement or scanning), the controller of the electronic device 601 may control the switching unit to enable the second communication scheme to use the frequency band which is used in the first communication scheme.

When, as a result of the scanning, an AP is discovered that uses the second band, the electronic device 601 may change the Wi-Fi function to the second band in operation 1770. Thus, in operation 1775, the electronic device 601 may transmit a measurement report for the configured band to the base station 600. The electronic device 601 may perform the LAA function on the first band and the Wi-Fi function on the second band in operation 1780.

The message for the measurement report may be labeled in the header 'Measurement Report,' and what is reported may contain information about, e.g., the signal strength/quality of the configured frequency band. The message for the measurement report may further contain information about what frequency band the electronic device 601 may use in the LAA function.

Figure 19:
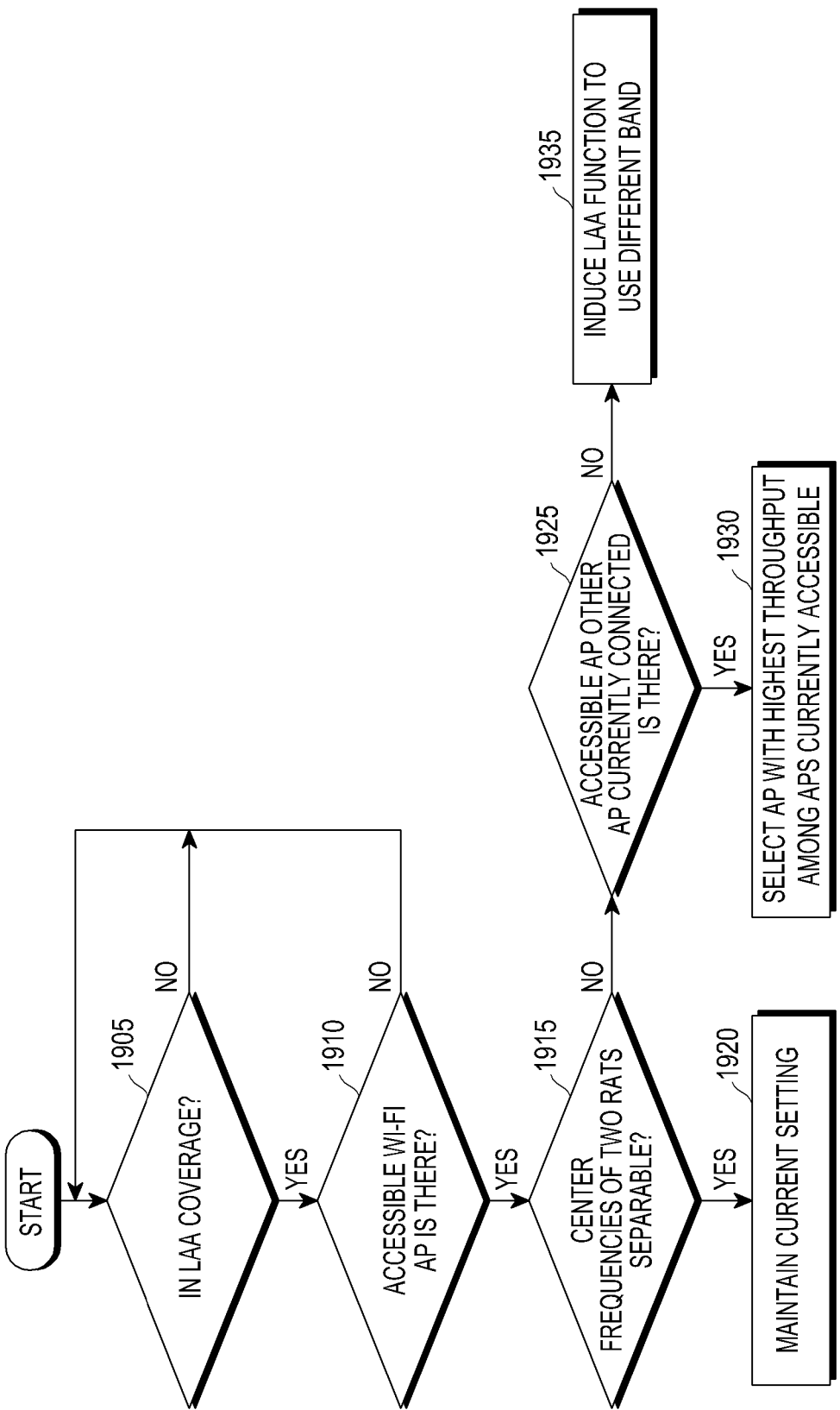
FIG. 19 is a flowchart of a method of an electronic device for sharing an LAA function and a Wi-Fi function, according to an embodiment of the present disclosure.

FIG. 19 is a flowchart of a method of an electronic device for sharing an LAA function and a Wi-Fi function, according to an embodiment of the present disclosure. FIG. 19 is an example in which, among RATs using an unlicensed band in the electronic device 601, LAA and Wi-Fi are supported.

The electronic device 601 may determine whether it is within the LAA coverage in operation 1905. When the electronic device 601 is located in the LAA coverage as shown in FIG. 6, whether there is an accessible 5 GHz band AP may be searched in operation 1910. When an available AP is searched through scanning, the electronic device 601 may determine whether the center frequencies of two RATs, i.e., LAA and Wi-Fi, may be separated per band in operation 1915. When the center frequency of LAA and the center frequency of Wi-Fi may be separated per band using a duplexer/diplexer (e.g., the duplexer/diplexer 1010), the current setting may be maintained, in which the per-band frequency signals have been matched to be used in their respective corresponding LAA function and Wi-Fi function, in operation 1920.

For example, the frequency used in LAA may be used by evolved universal terrestrial radio access (EUTRA) absolute radio-frequency channel number (EARFCN) information. When the frequency used in LAA and the frequency of the accessible AP may be separated into different bands in the unlicensed band through the duplexer/diplexer (e.g., the duplexer/diplexer 1010), LAA and Wi-Fi are used as per the current setting, and the controller 1040 to control the switching unit (e.g., the XPYT 1015) may match the separated signals to the communication modules (e.g., RAT 1 1025, . . . , RAT N 1035) to receive the frequency signals used in the communication modules (e.g., RAT 1 1025, . . . , RAT N 1035).

Unless the center frequency of LAA and the center frequency of Wi-Fi may be separated using the duplexer/diplexer (e.g., the duplexer/diplexer 1010), e.g., when the band gap between the two center frequencies is small enough to let the filter areas overlap each other, the electronic device 601 may control a shift of one of the center frequency of LAA and the center frequency of Wi-Fi.

For example, FIG. 12C illustrates an example in which such separation is carried out using different filters, e.g., filter 1 and filter 2, for the center frequencies of LAA and Wi-Fi. However, when only one of the filter 1 and filter 2 is used for the center frequency of LAA and the center frequency of Wi-Fi, the two center frequencies may not be separated. Accordingly, the electronic device 601 may shift at least one of the center frequency of LAA and the center function of Wi-Fi.

Thus, unless the center frequency of LAA and the center frequency of Wi-Fi may be separated per band in operation 1915, the electronic device 601 may search other accessible APs than the AP currently accessed in operation 1925.

When the LAA function uses the frequency band of the filter area corresponding to filter 1, the electronic device 601 can find the AP that uses the frequency band of the filter area corresponding to filter 2 which does not overlap filter 1. When there is no AP searched, the electronic device 601 may shift the center frequency that is used in the LAA function.

The electronic device 601 may search for another AP that uses a different frequency band than the frequency band used in the AP currently accessed among the ambient APs. When at least one AP is searched, the electronic device 601 may select the AP presenting the highest throughput (or performance) among the APs currently accessible in operation 1930.

However, when there are many accessible APs in operation 1925, the electronic device 601 may select the AP presenting the maximum throughput based on, e.g., the received signal strength, available bandwidth, or network state information.

A predicted throughput for Wi-Fi should be obtained to select the AP presenting the maximum throughput. The predicted throughput may be yielded by implementing a throughput estimator in the electronic device 601.

The throughput estimator may include a link quality estimator, a link quality modulation coding scheme (MCS) estimator, and a channel occupancy estimator.

The link quality estimator may receive beacon frames periodically transmitted from the Wi-Fi AP to measure the signal strength. Upon measuring the signal strength, the link quality estimator may measure the received signal strength (RSS), which is the received signal strength of all the frames or the per-subcarrier signal-to-noise ratio SNR.

The MCS that the electronic device 601 uses on downlink is determined by the AP. Since Wi-Fi may have no algorithm by which the electronic device 601 reports its channel state to the AP, the link quality MCS estimator may estimate the AP corresponding to the channel state. To that end, the link quality MCS estimator may continue to store the MCS that the AP used to use in the previous link state of the electronic device 601 and estimate the MCS predicted to be used by the AP as per the stored MCS history.

Wi-Fi, because of using unlicensed bands, shares with other LAA SCells/Wi-Fi APs channels that have been divided by TDMA through LBT. Accordingly, the channel occupancy estimator may measure the channel state over the entire time $T_{WINDOW}$, measuring the idle channel time $T_{IDLE}$.

The final throughput may be computed by the three components of the throughput estimator based on Equation (1):

$$MCS(RSS, SNR) \times \frac{T_{IDLE}}{T_{WINDOW}} \times \alpha \qquad (1)$$

In Equation 1, $\alpha$ ($0<\alpha<1$) is a parameter to make up for the failure to use the idle channels corresponding to $T_{IDLE}$ by all the WiFi Target APs.

While in operation 1925 an operation to control Wi-Fi to search for other frequency bands is described as an example, the operation of controlling LAA to search for other frequency bands may first be performed, and the order may be changed.

Where there is no AP accessible other than the AP currently accessed, the electronic device 601 may perform the operation of controlling the LAA function to use a different band in operation 1935. The operation of controlling the LAA function to use a different band has been described above in connection with FIG. 17.

At least a part of the devices (e.g., modules or their functions) or methods described herein (e.g., operations) may be implemented as instructions stored in a non-transitory computer-readable storage medium (e.g., the memory 130) in the form of a program module. The instructions, when executed by a processor (e.g., the processor 120), may enable the processor to carry out a corresponding function. The non-transitory computer-readable medium may include a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instructions may include a code created by a compiler or a code executable by an interpreter.

Modules or programming modules described herein may include at least one or more of the aforementioned components, omit some of them, or further include other additional components. Operations performed by modules, programming modules or other components may be carried out sequentially, in parallel, repeatedly or heuristically, or at least some operations may be executed in a different order or omitted or other operations may be added.

According to an embodiment of the present disclosure, there is provided a storage medium storing commands configured to be executed by at least one processor to enable the at least one processor to perform at least one operation that may comprise filtering signals received from one or more antennas for communication on a designated band into signals of two or more bands and performing switching so that, upon outputting a signal of a first band of the two or more bands to a first communication unit using a first communication function, a signal of a second band of the two or more bands is output to a second communication unit using a second communication function.

As is apparent from the foregoing description, an electronic device may allow different RATs to simultaneously use the same or close frequencies of an unlicensed band, enabling high-speed, high-volume data processing.

Moreover, a limited number of antennas for communication on an unlicensed band provided in an electronic device may be shared by different RATs. Thus, no additional antennas are required to achieve a high data transmission speed.

Furthermore, RATs other than a particular RAT using an unlicensed band in an electronic device may also use the unlicensed band. Thus, mobile network operators may secure a new frequency band without purchasing an additional frequency band.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
at least one antenna on a designated band;
at least one filtering unit configured to filter signals received from the at least one antenna into a plurality of bands of the designated band;
at least one switching unit configured to output the signals filtered by the at least one filtering unit to a first communication unit using a first communication function and a second communication unit using a second communication function, wherein the first communication unit supports a cellular communication and the second communication unit supports a wireless local area network (WLAN) communication; and
a processor electrically connected with the at least one switching unit, the first communication unit, and the second communication unit, configured to:
 identify a signal of a first band and a signal of a second band corresponding to the first communication unit and the second communication unit, respectively, based on communication-related information provided from the first communication unit and the second communication unit, and
 control the at least one switching unit so that, when the signal of the first band in the designated band is output to the first communication unit, the signal of the second band in the designated band is output to the second communication unit,
wherein the communication-related information includes information about whether the first communication function and the second communication function are active.

2. The electronic device of claim 1, wherein the at least one switching unit is a multiple pole multiple throw (MPMT) switch.

3. The electronic device of claim 1, wherein the at least one switching unit includes first multiple ports connected with the at least one filtering unit and second multiple ports for one of transmitting and receiving signals with the first communication unit and the second communication unit, and wherein a number of the second multiple ports is greater than a number of the first multiple ports.

4. The electronic device of claim 1, wherein the at least one filtering unit is one of a duplexer and a diplexer.

5. The electronic device of claim 1, wherein the processor is further configured to control the at least one switch to output each of the signal for the first band and the signal of the second band to a respective one of the first communication unit and the second communication unit.

6. The electronic device of claim 5, wherein the communication-related information further includes at least one of information about a frequency being currently used, a data transmission and/or reception state, and an amount of data transmitted/received.

7. The electronic device of claim 1, wherein when a number of the at least one antenna is two or more, a number of the at least one filtering unit and a number of the at least one switching unit each are two or more so that each of the at least one filtering unit corresponds to a respective one of the at least one antenna and each of the at least one switching unit corresponds to a respective one of the at least one antenna.

8. The electronic device of claim 1, wherein the processor is further configured to control the at least one switching unit to form one of a transmission path and a reception path between the second communication unit and an antenna corresponding to one of a signal transmission operation and reception operation of the second communication unit.

9. The electronic device of claim 8, wherein when the signal of the first band is output to the first communication unit, the processor is configured to control the at least one switching unit to transmit a transmission signal from the second communication unit using a frequency of the second band.

10. The electronic device of claim 1, wherein the designated band is a 5 GHz band in an unlicensed band.

11. The electronic device of claim 1, wherein when a frequency band used in the first communication unit at least partially overlaps a frequency band used in the second communication unit, the processor is configured to control one of the first communication unit and the second communication unit to use a different frequency band.

12. The electronic device of claim 11, wherein upon receiving a message to configure a measurement for the second band in the designated band from a base station corresponding to the first communication unit, the processor is configured to determine whether the signal of the second band is being used in the second communication unit, and when the signal of the second band is being used in the second communication unit, the processor is configured to transmit a measurement report message including information for preventing the base station from configuring the second band.

13. A method for controlling communication in an electronic device, the method comprising:
    filtering signals received from one or more antennas for communication on a designated band into signals of two or more bands;
    identifying a first band and a second band corresponding to a first communication unit and a second communication unit, respectively, among the two or more bands, based on communication-related information provided from the first communication unit and the second communication unit, wherein the first communication unit supports a cellular communication and the second communication unit supports a wireless local area network (WLAN) communication; and
    performing switching so that, upon outputting a signal of the first band of the two or more bands to the first communication unit using a first communication function, a signal of the second band of the two or more bands is output to the second communication unit using a second communication function,
    wherein the communication-related information includes information about whether the first communication function and the second communication function are active.

14. The method of claim 13, wherein switching the signal uses a multiple pole multiple throw (MPMT) switch including first multiple ports for receiving the filtered signals and second multiple ports for one of transmitting and receiving signals for one of the first communication function and the second communication function, and wherein the number of the second multiple ports is greater than the number of the first multiple ports.

15. The method of claim 13, wherein filtering the signals uses one of a duplexer and a diplexer.

16. The method of claim 13, wherein the communication-related information includes at least one of information about a frequency being currently used, a data transmission/reception state, and the amount of data transmitted/received.

17. The method of claim 13, further comprising, while performing the first communication function using the signal of the first band and the second communication function using the signal of the second band,
    temporarily performing switching so that the signal of the second band used in the second communication function is used in the first communication function when the first communication function performs wireless environment monitoring.

18. The method of claim 13, further comprising performing switching to form one of a transmission path from the second communication unit to the one or more antennas and a reception path from the one or more antennas to the second communication unit corresponding to one of a signal transmission operation and reception operation of the second communication unit.

19. The method of claim 13, wherein the designated band is a 5 GHz band in an unlicensed band.

20. The method of claim 13, further comprising, when a frequency band used in the first communication unit at least partially overlaps a frequency band used in the second communication unit, controlling one of the first communication unit and the second communication unit to use a different frequency band.

21. The method of claim 20, further comprising:
    upon receiving a message to configure a measurement for the second band in the designated band from a base station corresponding to the first communication unit, determining whether the signal of the second band is being used in the second communication unit; and
    when the signal of the second band is being used in the second communication unit, transmitting a measurement report message including information for preventing the base station from configuring the second band.

* * * * *